(12) United States Patent
Koyanagi et al.

(10) Patent No.: US 8,045,837 B2
(45) Date of Patent: Oct. 25, 2011

(54) CONTROLLER FOR PHOTOGRAPHING APPARATUS AND PHOTOGRAPHING SYSTEM

(75) Inventors: Masakazu Koyanagi, Chiba (JP); Tadafusa Tomitaka, Chiba (JP); Toshiyuki Iijima, Kanagawa (JP); Naoyasu Hosonuma, Saitama (JP); Ken Tamayama, Tokyo (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 12/505,814

(22) Filed: Jul. 20, 2009

(65) Prior Publication Data

US 2009/0278914 A1    Nov. 12, 2009

Related U.S. Application Data

(63) Continuation of application No. 12/269,095, filed on Nov. 12, 2008, now Pat. No. 7,720,359, which is a continuation of application No. 10/766,405, filed on Jan. 27, 2004, now abandoned, which is a continuation of application No. 09/059,774, filed on Apr. 14, 1998, now Pat. No. 6,720,987.

(30) Foreign Application Priority Data

Apr. 21, 1997  (JP) ..................................... 9-103455
Sep. 26, 1997  (JP) ..................................... 9-261827

(51) Int. Cl.
  *H04N 5/77*    (2006.01)
  *H04N 5/775*   (2006.01)
(52) U.S. Cl. ...................................... 386/224; 386/230
(58) Field of Classification Search ................... 386/224, 386/230, 223, 234, 278
See application file for complete search history.

(56) References Cited

U.S. PATENT DOCUMENTS

| | | |
|---|---|---|
| 4,383,745 A | 5/1983 | Kawamura et al. |
| 4,672,435 A | 6/1987 | Gluck |
| 4,786,944 A | 11/1988 | Sakamoto et al. |
| 5,528,290 A | 6/1996 | Saund |
| 5,650,813 A | 7/1997 | Gilblom et al. |
| 5,657,073 A | 8/1997 | Henley |
| 5,657,246 A | 8/1997 | Hogan et al. |
| 5,745,126 A | 4/1998 | Jain et al. |
| 5,963,213 A | 10/1999 | Guedalia et al. |
| 6,031,941 A | 2/2000 | Yano et al. |
| 6,034,716 A | 3/2000 | Whiting et al. |
| 6,037,936 A | 3/2000 | Ellenby et al. |
| 6,084,592 A | 7/2000 | Shum et al. |
| 6,104,425 A | 8/2000 | Kanno |

(Continued)

FOREIGN PATENT DOCUMENTS

JP    03-185997    8/1991

(Continued)

*Primary Examiner* — Robert Chevalier
(74) *Attorney, Agent, or Firm* — Frommer Lawrence & Haug LLP; William S. Frommer; Ellen Marcie Emas

(57) ABSTRACT

A picture photographed by a camera portion is sent to a video capturing portion of a computer. The picture is displayed in an operation area of a monitor. A panorama picture of which pictures in part or all moving range of a pan tiler are combined is displayed in a panorama operation area. A pan tilter portion sends positional information of pan and tilt to the computer through a mode controller. With a mouse, the operation area and the panorama operation area are operated so as to select an object. The computer obtains data for driving the pan tilter. Thus, the selected object is displayed at the center of the operation area.

16 Claims, 24 Drawing Sheets

U.S. PATENT DOCUMENTS

| | | |
|---|---|---|
| 6,256,401 B1 | 7/2001 | Whited |
| 6,337,709 B1 | 1/2002 | Yamaashi et al. |
| 6,400,401 B1 | 6/2002 | Morino et al. |
| 6,414,716 B1 | 7/2002 | Kawai |
| 6,552,744 B2 | 4/2003 | Chen |
| 6,583,815 B1 | 6/2003 | Driscoll et al. |
| 6,720,987 B2 | 4/2004 | Koyanagi et al. |
| 7,098,940 B2 | 8/2006 | Suzuki et al. |
| 7,199,817 B2 | 4/2007 | Mottur et al. |
| 2001/0040636 A1 | 11/2001 | Kako et al. |

FOREIGN PATENT DOCUMENTS

| | | | |
|---|---|---|---|
| JP | 405314226 A | * | 11/1993 |
| JP | 8 149356 | | 6/1996 |
| JP | 8 154195 | | 6/1996 |
| JP | 8 223466 | | 8/1996 |
| JP | 08-289194 | | 11/1996 |

* cited by examiner

Fig. 4D
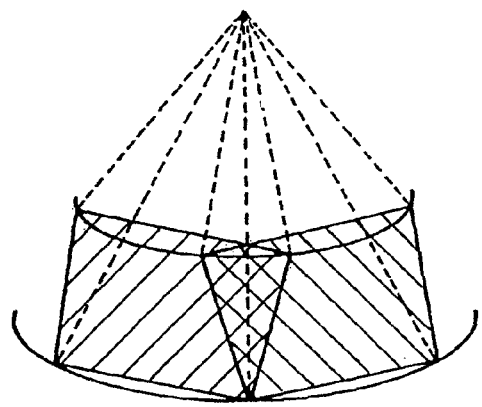
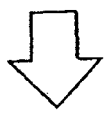
Fig. 4E
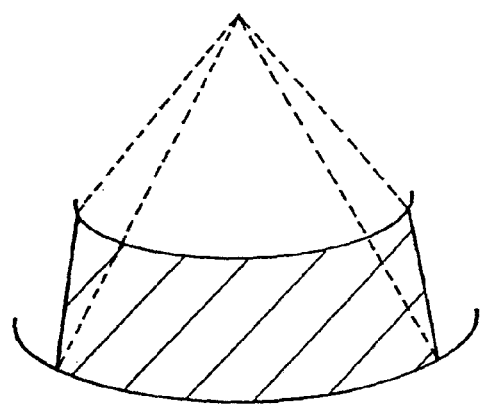
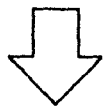
Fig. 4F
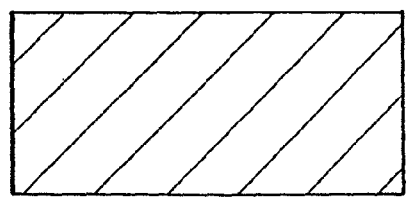

Fig. 9A
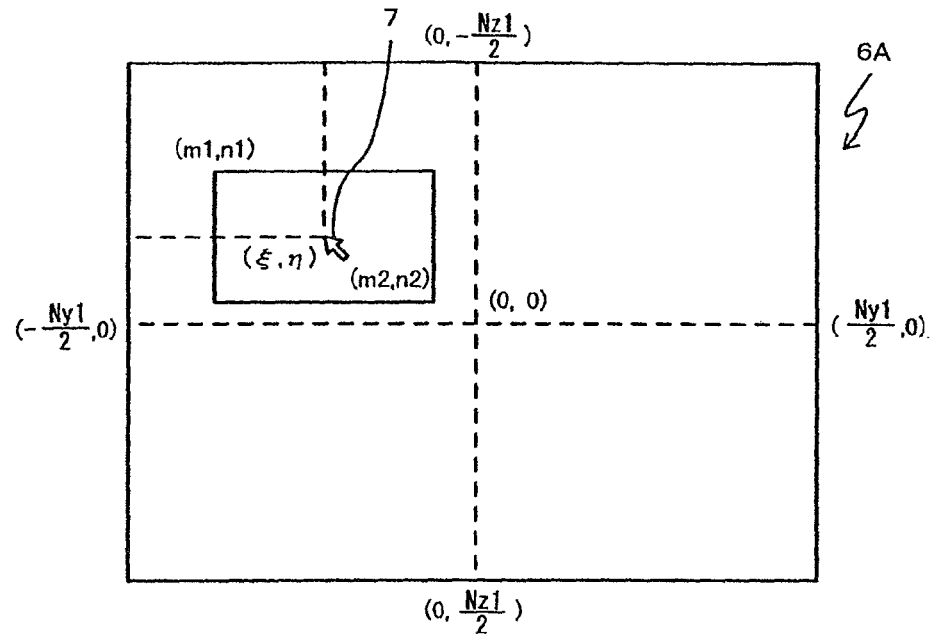
Fig. 9B
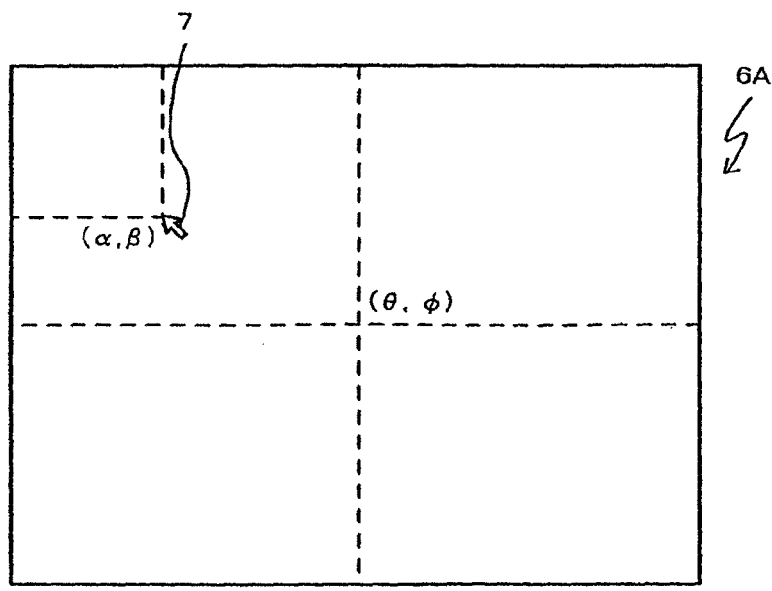

HORIZONTAL ANGLE OF VIEW($\psi$)

VERTICAL ANGLE OF VIEW ($\omega$)

PAN ANGLE  PragMin  $\psi$  PragMax

COORDINATE DATA  $-\dfrac{Ny2}{2}$  s  $\dfrac{Ny2}{2}$

TILT ANGLE  TragMin  $\omega$  TragMax

COORDINATE DATA  $-\dfrac{Nz2}{2}$  t  $\dfrac{Nz2}{2}$

HORIZONTAL ANGLE OF VIEW(s)

VERTICAL ANGLE OF VIEW(t)

CONTROLLER FOR PHOTOGRAPHING APPARATUS AND PHOTOGRAPHING SYSTEM

The present application is a continuation of application Ser. No. 12/269,095, filed Nov. 12, 2008, now U.S. Pat. No. 7,720,359 which is a continuation of application Ser. No. 10/766,405, filed Jan. 27, 2004, now abandoned which is a continuation of application Ser. No. 09/059,774, filed Apr. 14, 1998, now U.S. Pat. No. 6,720,987.

BACKGROUND OF THE INVENTION

1. Field of the Invention

The present invention relates to a controller for a photographing apparatus and a photographing system with a high operational characteristic and a high visibility suitable for a photographing operation of the apparatus that is disposed at a remote place and that is used for a monitoring operation, an observing operation, a guiding operation, a presenting operation, and so forth.

2. Description of the Related Art

As shown in FIG. 23, when the user controls a photographing apparatus disposed at a remote place, he or she operates a pan tilter in eight directions (up, down, left, right, upper right, lower right, upper left, and lower left directions) with eight-direction keys, a zooming controller, and a wide-angle controller so as to photograph a desired object while observing a photographed picture 6A on a monitor 2. In the structure shown in FIG. 23, the user moves a cursor 7 to one of the direction keys 10 with a mouse 8. Alternatively, after the user has controlled a photographing apparatus disposed at a remote place in the above-described method and registered pan tilter information and zoom information of positions of pictures to be photographed, he or she drives the photographing apparatus at absolute positions corresponding to the registered positions so as to select pictures.

In the conventional controller, a picture that is displayed on the monitor is limited in the range of which the photographing apparatus is moved by the pan tilter. Thus, when the user photographs a desired object, he or she should operate the pan tilter in the full range thereof. Consequently, the user should have skill in operating the pan tilter.

When the user changes the photographing direction with the conventional direction keys, even if he or she stops pressing the direction keys, since the pan tilter does not immediately stops and thereby he or she may not catch a desired object. When the direction varying speed of the photographing apparatus with the pan tilter is low, although such a problem may be solved, since the response characteristic deteriorates, a high operational characteristic cannot be obtained.

When the user wants to place a desired object at the center of the angle of view of the photographing apparatus, since he or she controls the photographing direction while observing a picture on the monitor, he or she should determine the photographing direction on trial and error basis. Thus, the user may spend a long time for controlling the photographing apparatus. Moreover, to properly operate the photographing apparatus, the user should have skill.

When picture and control information is exchanged with a photographing apparatus disposed at a remote place through a low-capacity network, the control information may be lost and/or picture information may be delayed due to an irregularity of their arrival intervals. If the pan tilter or the zooming controller is operated for picture and control information that has been delayed or lost, even if the user causes the pan tilter and the zooming controller to place the object at the desired position, the pan tilter and the zooming controller do not properly operate. Thus, the object is placed at an improper position due to the delay. In addition, depending on the line condition, the arrival intervals of picture information vary. Thus, the user should control the pan tilter and the zooming controller based on a prediction. Consequently, the user cannot properly control the pan tilter and the zooming controller.

OBJECTS AND SUMMARY OF THE INVENTION

Therefore, an object of the present invention is to provide a controller for a photographing apparatus for allowing the user to designate a desired position or a desired area on a panorama picture displayed as a part or all the moving range of a pan tilter so that the user can easily obtain a desired picture with the photographing apparatus.

Another object of the present invention is to provide a controller for a photographing apparatus and a photographing system with a high visibility and a high operational characteristic that allow the user to designate a desired position or a desired area on a screen and select an object with the designated position or area and the photographing apparatus to place the selected object at the center of the screen.

A first aspect of the present invention is a controller for a photographing apparatus having a photographing portion with driving means that allows the photographing direction of photographing means to be varied, comprising a displaying means for displaying a panorama picture generated with a picture photographed by the photographing means, and a controlling means for referencing the panorama picture and varying the photographing direction of the photographing means.

A second aspect of the present invention is a controller for a photographing apparatus having a photographing portion with driving means that allows the photographing direction of photographing means to be varied, the controller comprising an operation area in which a panorama picture generated with a picture photographed by the photographing means is displayed, and a picture selecting means for allowing the user to designate a desired point in the operation area, selecting an object photographed by the photographing means corresponding to the designated point, and moving the selected object to desired positional coordinates of the driving means.

A third aspect of the present invention is a controller for a photographing apparatus having a photographing portion with driving means that allows the photographing direction of photographing means to be varied, the controller comprising an operation area in which a panorama picture generated with a picture photographed by the photographing means is displayed, and a picture selecting means for allowing the user to designate a desired area in the operation area, selecting an object photographed by the photographing means corresponding to the designated area, and moving an object at the position corresponding to a desired point generated with the desired area to desired positional coordinates of the driving means.

A fourth aspect of the present invention is a photographing system having a photographing portion with driving means that allows the photographing direction of photographing means to be varied and a controller for a photographing apparatus, the controller controlling the photographing portion, wherein the controller comprises an operation area in which a panorama picture generated with a picture photographed by the photographing means is displayed, and a picture selecting means for selecting an object photographed by the photographing means in the operation area and moving the selected object to desired positional coordinates of the driving means.

A picture photographed by a pan tilter camera that is disposed at a remote place and that can be moved in various directions is sent to a computer. The picture is displayed as a panorama picture in a display area of a monitor. The direction of a picture selecting means corresponding to the direction of an object to be placed at the center of the angle of view of the photographing apparatus in the panorama picture is designated by a pointing device connected to the computer. Since the pan tilter is controlled with reference to the panorama picture, a desired picture can be photographed by the photographing apparatus.

In addition, the environment of the place at which the pan tilter camera is disposed is displayed as a panorama picture in the panorama operation area of the monitor of the computer. A desired point to be placed at the center of the angle of view of the photographing apparatus in a picture of the panorama operation area or a desired point generated with a desired area is designated by the pointing device connected to the computer. Thus, in the method of which the result is input, a selected object can be easily placed at the center of the screen. In addition, since a desired point in the operation area on the screen or a desired point generated with a desired area is designated with the pointing device, the user can easily know the driving direction of the pan tilter camera. In addition to the panorama operation area, another operation area for a picture may be displayed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 4A to 4F are schematic diagrams for explaining a method for generating a panorama picture according to the embodiment of the present invention;

FIGS. 9A and 9B are schematic diagrams for explaining a coordinate converting method in the operation area according to the embodiment of the present invention;

DETAILED DESCRIPTION OF THE PREFERRED EMBODIMENTS

Figure 1:
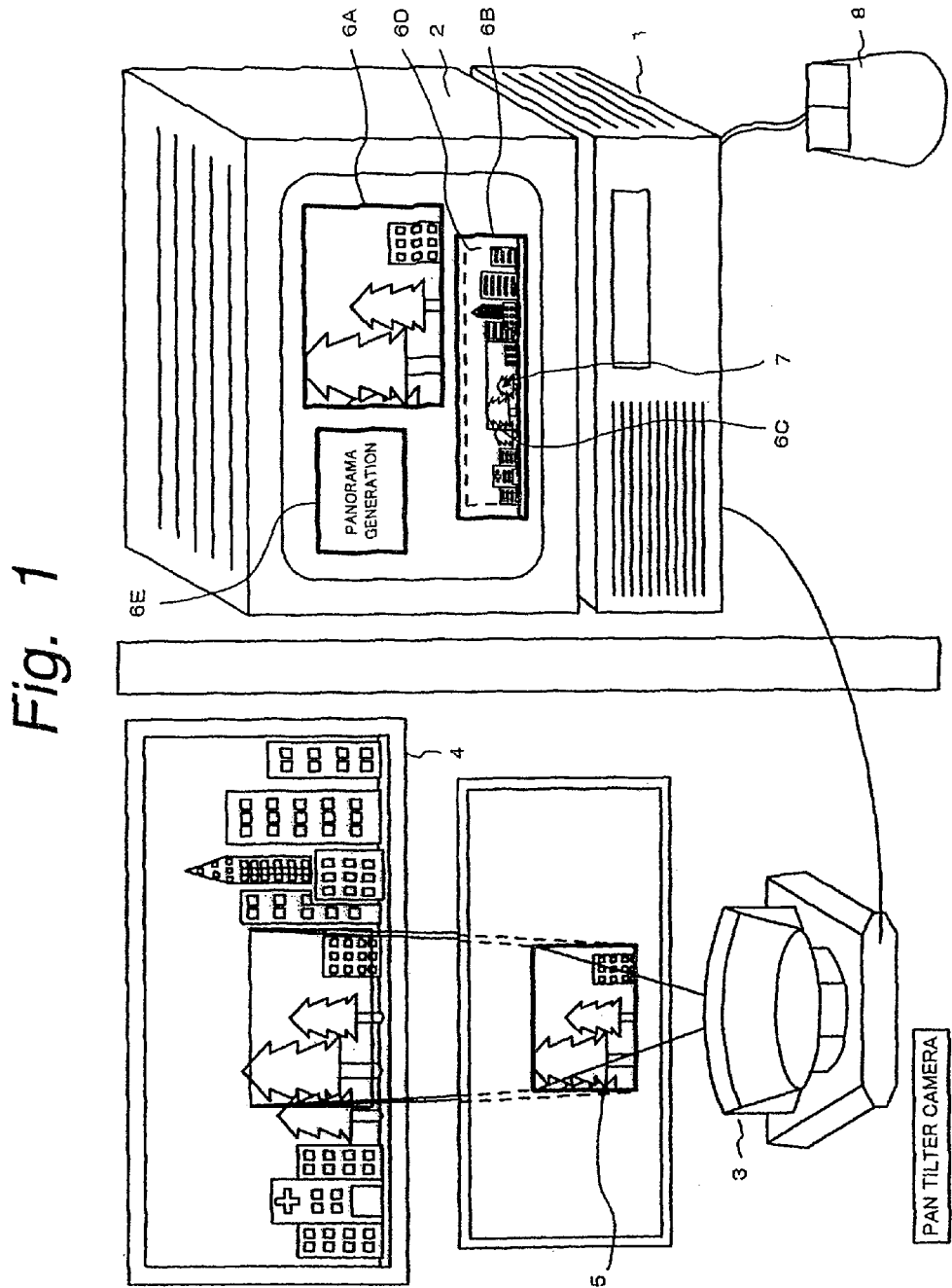
FIG. 1 is an external view for explaining a system according to an embodiment of the present invention.

Next, with reference to the accompanying drawings, embodiments of the present invention will be described. FIG. 1 shows an outline of the structure of a system according to a first embodiment of the present invention. A monitor 2 and a mouse 8 are connected to a computer 1. The computer 1 controls the driving operation of a pan tiler camera 3 disposed at a remote place. In other words, a controller for the photographing apparatus is composed of the computer 1.

The pan tilter camera 3 is integrally composed of a pan tilter portion and a camera portion. In FIG. 1, the pan tilter camera 3 is disposed on a real scene as denoted by 4. A screen of a picture photographed by the pan tilter camera 3 is denoted by 5. This screen is hereinafter referred to as a photographed screen. The photographed screen 5 is an actually photographed screen. When a zoom lens of the pan tilter camera 3 is placed on the telephotograph side, the angle of view decreases. In contrast, when the zoom lens of the pan tilter camera 3 is placed on the wide-angle side, the angle of view increases.

A picture on a photographed screen 5 captured by a pan tilter camera 3 is sent to a computer 1 through a video cable or the like. The picture data sent to the computer 1 is decoded and displayed on a monitor 2. The monitor 2 displays the photographed screen 5 in an operation area 6A on the monitor 2. A panorama picture including the picture photographed by the pan tilter camera 3 is displayed in a panorama operation area 6B. An arrow-shaped cursor 7 is displayed at the position of a mouse pointer of a mouse 8 in the operation area 6A or the panorama display area 6B. The user designates a desired point or a desired area in the operation area 6A or the panorama operation area 6B with the mouse 8 so as to operate the pan tilter camera 3. In the panorama operation area 6B, a frame 6C that represents the current position and the angle of view of the pan tilter and a pan tilter limiter 6D are superimposed to the panorama picture. The pan tilter limiter 6D represents the moving range of the pan tilter camera. In addition, when necessary, a panorama generation button 6E is displayed on the monitor 2.

Figure 2:
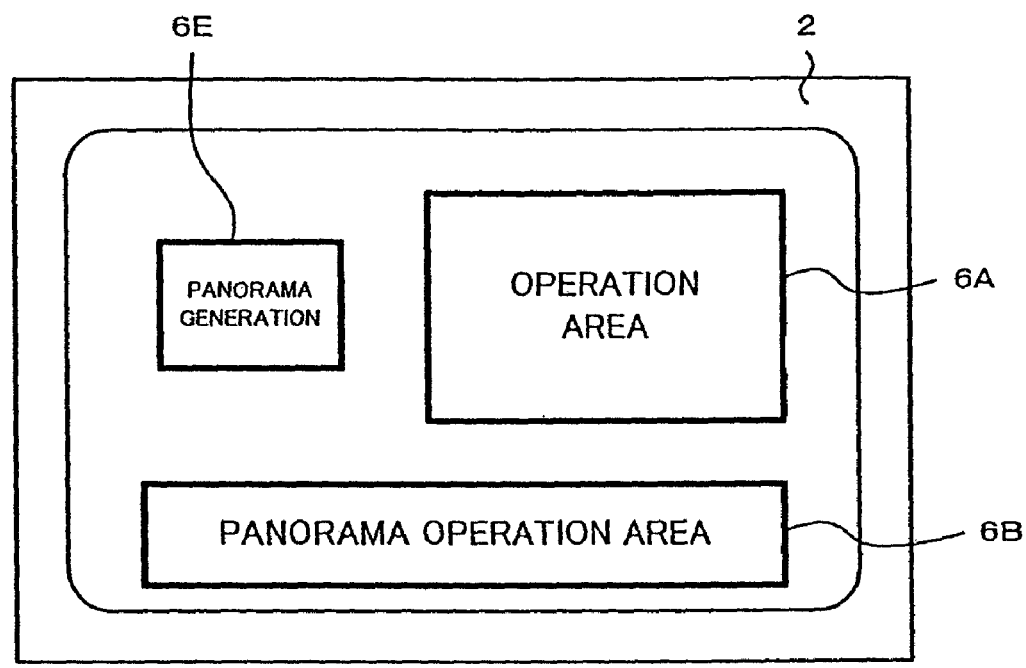
FIG. 2 is a schematic diagram for explaining a screen of a monitor according to the embodiment of the present invention.

As shown in FIG. 2, the operation area 6A and the panorama operation area 6B are displayed on the monitor 2. With the mouse 8, the user can move the cursor 7 and designate a desired point or a desired point generated with a desired area in the operation area 6A or the panorama operation area 6B. The user operates the pan tiler so that an object corresponding to the designated point is placed at the center of the operation area 6A. In other words, when the user inputs a result to be displayed, an object selected corresponding to the input data is displayed at the center of the operation area 6A.

Figure 3:
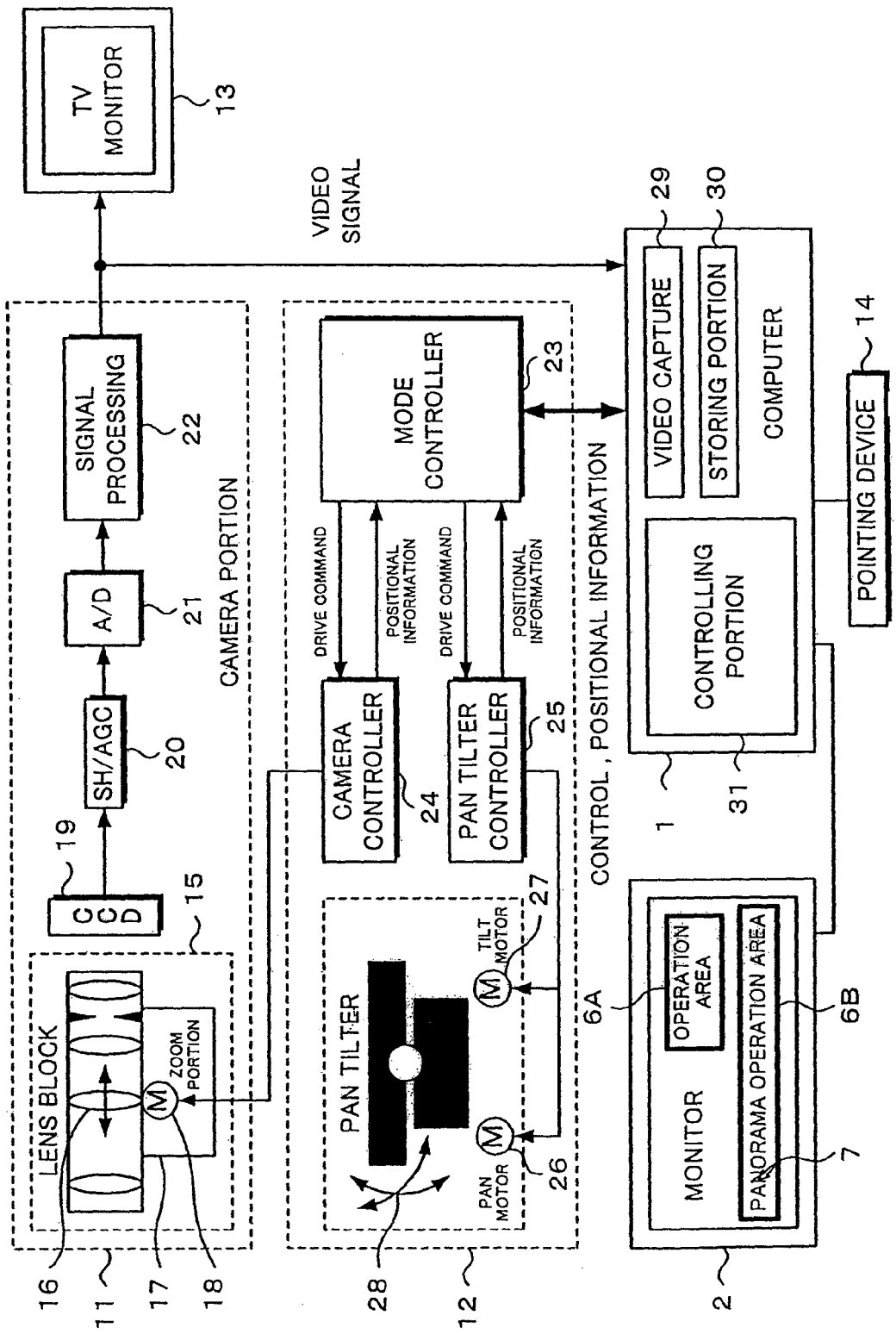
FIG. 3 is a block diagram showing the structure of the system according to the embodiment of the present invention.

FIG. 3 is a block diagram showing the overall system according to the embodiment of the present invention. The system shown in FIG. 3 comprises a camera portion 11, a pan tilter portion 12, a TV monitor 13, a computer 1, a pointing device 14 (such as a mouse 8), and a monitor 2. The pan tilter camera 3 comprises a camera portion 11 and a pan tilter portion 12. For example, the camera portion 11 is disposed on the pan tilter portion 12. The camera portion 11 comprises a lens block portion 15, a zoom lens 16, a zoom portion 17, a zoom lens motor 18, a solid state image pickup device 19, a signal separating/automatic gain adjusting circuit (SH/AGC) 20, an A/D converter 21, and a signal processing circuit 22. The camera portion 11 represents a video camera.

The pan tilter portion 12 comprises a mode controller 23, a camera controller 24, a pan tilter controller 25, a pan motor 26, a tilt motor 27, and a pan tilter 28. The computer 1 comprises a controlling portion 31, a video capture portion 29, and a storing portion 30. The video capture portion 29 is composed of a video capture board.

Rays emitted from an object are focused to the solid state image pickup device 19 through a lens set and a diaphragm of the lens block portion 15. An example of the solid state image pickup device 19 is a CCD (Charge Coupled Device). The focused rays (field picture) are converted into a picture signal and then sent to the signal separating/automatic gain adjusting circuit 20. The signal separating/automatic gain adjusting circuit 20 samples/holds the picture signal and controls the gain of the picture signal with a control signal of an auto iris (AE). The resultant picture signal is sent to the signal processing circuit 22 through the A/D convertor 21. The signal processing circuit 22 converts the received picture signal into a brightness signal (Y), a color signal (C), and a video signal and sends these signals as picture signals to the TV monitor 13 and the video capture portion 29 of the computer 1.

The lens block portion 15 of the camera portion 11 drives the zoom lens 16 and thereby varies the angle of view of an object to be photographed. The lens block portion 15 causes the zoom lens motor 18 that is for example a stepping motor to rotate, thereby driving the zoom lens 16 corresponding to a drive command received from the camera controller 24 of the pan tilter portion 12. The camera controller 24 performs a lens controlling operation (for example, focusing operation and zooming operation), an exposure controlling operation (for example, diaphragm controlling operation, gain controlling operation, and speed controlling operation of electronic shutter), white balance controlling operation, a picture quality controlling operation, and so forth of the camera portion 11. In addition, the camera controller 24 interfaces with the mode controller 23. As interface controlling operations with respect to the zoom lens 16, the camera controller 24 sends a control signal to the motor driver corresponding to a drive command of the zoom lens 16 received from the mode controller 23 so that the zoom lens 16 is placed at the position designated by the command. In addition, the camera controllers 24 always sends positional information of the zoom lens 16 to the mode controller 23.

The camera portion 11 is disposed on the pan tilter portion 12 that has a degree of freedom that are rotating directions of two axes of pan and tilt. The pan tilter portion 12 causes the pan motor 26 and the tilt motor 27 to rotate corresponding to a drive command received from the pan tilter controller 25, thereby driving a pan head and a tilt head of the pan tilter 28. The motors 26 and 27 are composed of for example stepping motors. The pan tilter controller 25 sends a control signal to the motor drivers so that the pan head and the tilt head are driven to positions corresponding to a pan drive command and a tilt drive command received from mode controller 23. In addition, the pan tilter controller 25 always sends positional information of the pan head and the tilt head to the mode controller 23.

The mode controller 23 controls the overall system corresponding to the internal states of the camera portion 11 and the pan tilter portion 12 and the interface information received from the outside of the pan tilter camera 3 as will be described later. The mode controller 23 is connected with for example the computer 1 and RS-232C interface. The mode controller 23 sends drive commands received from the computer 1 to the pan tilter controller 25 and the camera controller 24 so as to drive the pan tilter 28 and the zoom lens 16 of the lens block portion 15. In addition, the mode controller 23 sends current positional information received from the pan tilter controller 25 and the camera controller 24 to the computer 1.

According to the embodiment, the computer 1 is used to select a picture photographed by the pan tilter camera 3. The computer 1 processes graphics in the operation area 6A and the panorama operation area 6B displayed on the monitor 2 and information of a designated position and a clicking operation of the pointing device 14 (mouse 8) and sends the resultant data to the mode controller 23. To display a picture photographed by a camera portion 11 on the monitor 2, a video capturing portion 29 is used. The video capturing portion 29 allows a video signal received from the camera portion 11 to be displayed on the monitor 2 with a desired picture quality. In addition, the video capturing portion 29 allows a picture to be captured in a particular picture format (for example, bit map format, still picture JPEG format, moving picture JPEG format, or the like) with a particular picture quality and to be stored in the storing portion 30 (for example, a hard disk) of the computer 1.

Next, with reference to FIG. 4, an example of a method for generating a Panorama picture displayed in the panorama operation area 6B will be described. It should be noted that according to the present invention, a panorama picture may be generated by another method. When the panorama generation button 6E is pressed, a panorama picture is generated.

Figure 4A:
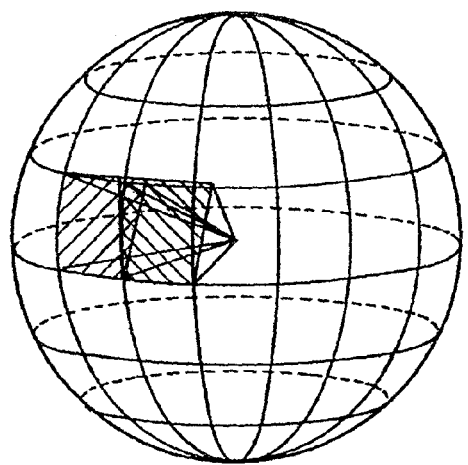

Now, it is assumed that the environment in the place where the pan tilter camera 3 is disposed is a spherical surface. The spherical surface is referred to as virtual spherical surface. In FIGS. 4A to 4F, two adjacent pictures on the virtual spherical surface are combined to one panorama picture. To generate a panorama picture, as shown in FIG. 4A, the pan tilter camera 3 disposed at the center of the sphere photographs two adjacent pictures on the virtual spherical surface. The pan tilter camera 3 photographs a plane perpendicular to the optical axis of the lens thereof. FIG. 4D shows a situation of which two adjacent pictures on the virtual spherical surface are photographed by the pan tilter camera 3 and the two pictures are mapped to the plane perpendicular to the optical axis. When two adjacent pictures are simply combined, they overlap and distort at the overlapped portion.

Figure 4B:
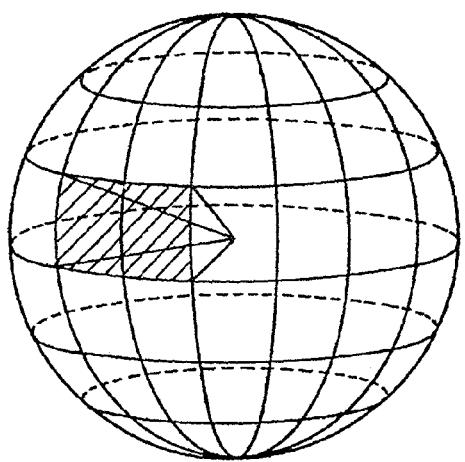
Figure 4C:
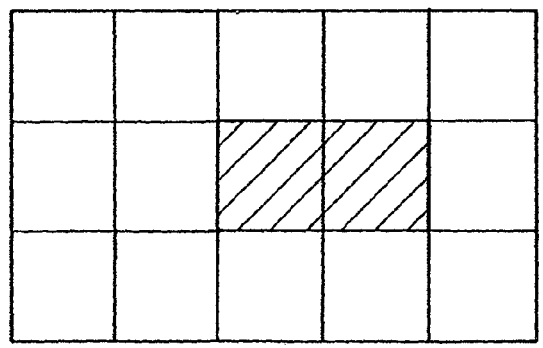

To prevent two adjacent pictures from overlapping and distorting, they are mapped to the virtual spherical surface as shown in FIG. 4B. FIG. 4E shows a situation of which two photographed pictures that are planes perpendicular to the optical axis are mapped to the virtual spherical surface. In such a manner, planes perpendicular to the optical axis (namely, photographed pictures) are mapped to the virtual spherical surface. The mapped pictures are combined in such a manner that an overlapped portion and an unnecessary portion are removed. The picture mapped on the virtual spherical surface is normalized with longitude and latitude. Thus, a panorama picture as shown in FIGS. 4C and 4D is generated.

Figure 5A:
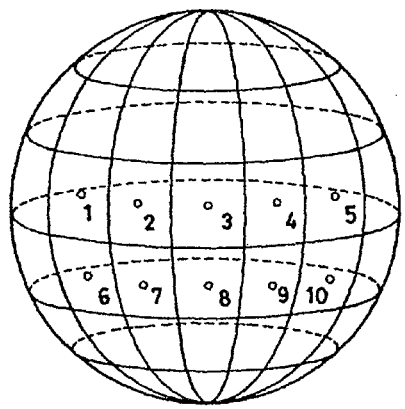
FIGS. 5A to 5D are schematic diagrams for explaining a method for generating a panorama picture according to the embodiment of the present invention.
Figure 5B:
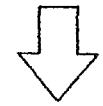
Figure 5C:
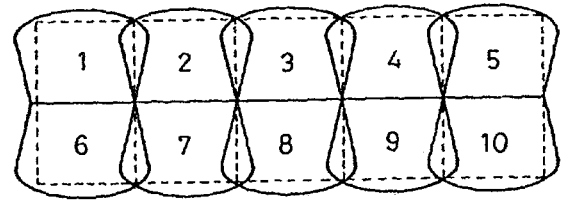
Figure 5D:
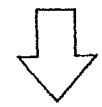

Next, a method for generating a panorama picture will be described. In this method, as shown in FIGS. 5A to 5D, one panorama picture is generated by combining 10 pictures. First, the pan tilter camera 3 (not shown) disposed at the center of the sphere photographs 10 pictures. At this point, as shown in FIG. 5A, by matching the optical axis of the lens of the pan tilter camera 3 to positions denoted by circles, the pan tilter camera 3 can obtain pictures 1 to 10. As shown in FIG. 5B, the pictures photographed by the pan tilter camera 3 are pictures on the plane perpendicular to the optical axis of the lens. The obtained pictures are mapped to the virtual spherical surface. Thereafter, as shown in FIG. 5C, the pictures are normalized with latitude and longitude. The pictures are obtained in such a manner that they are smoothly combined without a break. Thereafter, an overlapped portion and unnecessary portion are removed. Thus, a panorama picture of which 10 picture are smoothly combined is generated.

Figure 6A:
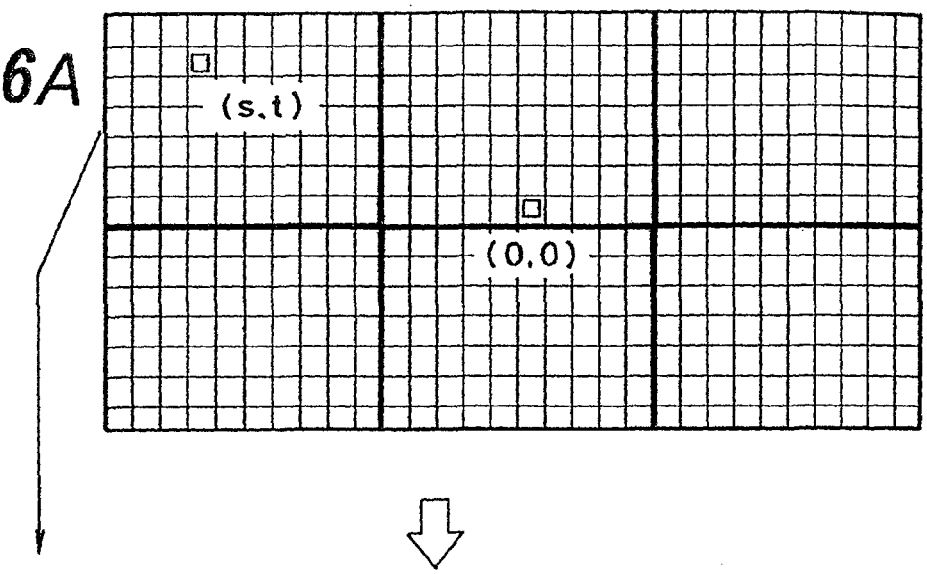
FIGS. 6A to 6C are schematic diagrams for explaining a method for generating a panorama picture according to the embodiment of the present invention.
Figure 6B:
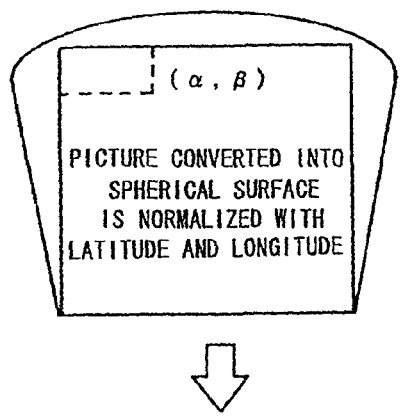

Next, with reference to FIG. 6, another method for generating a panorama picture will be described. In this method, pixels obtained by the pan tilter camera 3 are designated to pixels of a panorama picture normalized with latitude and longitude (namely, coordinates (s, t)). As in the method shown in FIGS. 5A to 5D, when pixels of pictures photographed by the pan tilter camera 3 are designated to pixels of a panorama picture, part of pixels of the panorama picture may not be designated. All pixels of pictures photographed by the pan tilter camera 3 should be designated to pixels of the panorama picture. The panorama picture is composed of pixels calculated for individual coordinate points in the following process. Angular coordinates ($\alpha$, $\beta$) (see FIG. 6B) on the virtual spherical surface corresponding to coordinates (s, t) (see FIG. 6) of a panorama picture are calculated corresponding to Eq. (1).

$$(\alpha, \beta) = (a(s), b(t)) \quad (1)$$

(Eq. (1) will be described later with reference to FIGS. 7A and 7B.)

Figure 6C:
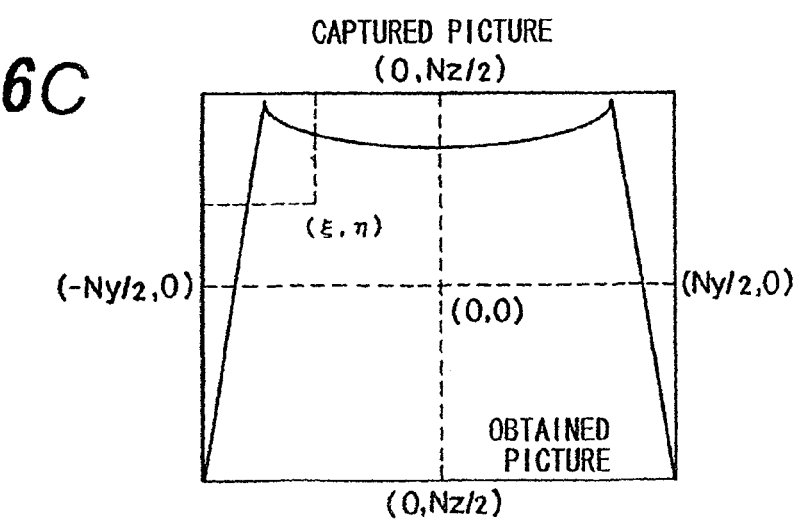

As shown in FIG. 6C, coordinate data ($\xi$, $\eta$) of the obtained picture is calculated with the coordinates (s, t), the angular coordinates ($\theta$, $\phi$) of a pan tilter 28, and photographing magnification assuming that the wide edge of the photographing apparatus is defined as one magnification corresponding to Eq. (2).

$$(\xi, \eta) = (f(\alpha, \beta, \theta, \phi, \gamma), g(\alpha, \beta, \theta, \phi, \gamma)) \quad (2)$$

(Eq. (2) will be described later with reference to FIGS. 8A and 8B.)

Corresponding to the above-described equations, pixels of the panorama picture are correlated with obtained pictures so as to generate a combined picture (namely, the panorama picture).

Figure 7A:
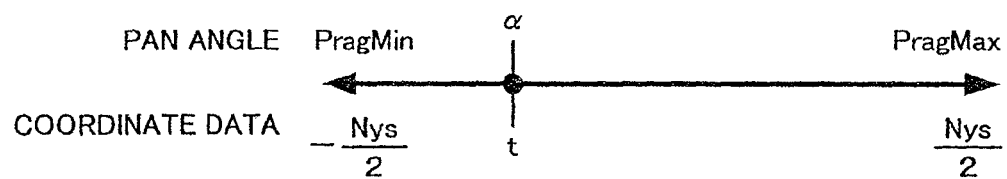
FIGS. 7A and 7B are schematic diagrams for explaining a method for generating angular information of a pan tilter camera with positional coordinates in a panorama operation area according to the embodiment of the present invention.

Next, with reference to FIGS. 7A and 7B, a method for converting coordinates (s, t) of a panorama picture into angular coordinates ($\alpha$, $\beta$) on the virtual spherical surface will be described. In FIG. 7A, PragMin represents angular data at the left edge assuming that the home position of the pan tilter 28 (for example, the center in the moving range of the pan tilter 28) is 0 (rag). PragMax represents angular data at the right edge assuming that the home position of the pan tilter 28 is 0 (reg). $Ny_2$ represents a horizontal coordinate of the panorama operation area 6B. $-Ny_2/2$ represents coordinate data at the right edge of the panorama operation area 6B.

To obtain the pan angle $\alpha$ with the coordinate data s, since the following relation is satisfied $$(PragMax - \alpha):(PragMax - PragMin) = (Ny_2/2 - s):Ny_2$$

the pan angle $\alpha$ is expressed as follows.

$$\alpha = PragMax - (PragMax - PragMin) \times (Ny_2/2 - s)/Ny_2$$

Figure 7B:
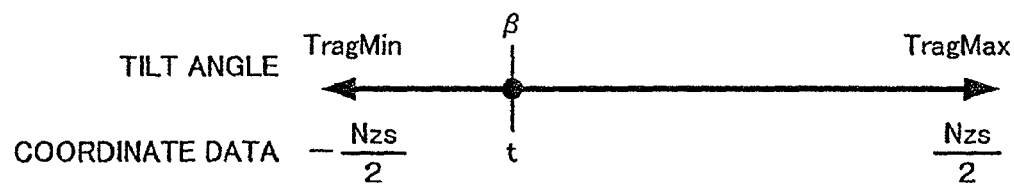

In FIG. 7B, TragMin represents angular data at the upper edge assuming that the home position of the pan tilter 28 is 0 (rag). TragMax represents angular data at the lower edge assuming that the home position of the pan tilter 28 is 0 (rag). $Nz_2$ represents a vertical coordinate of the panorama operation area 6B. $-Nz_2/2$ represents coordinate data at the upper edge of the panorama operation area 6B. $Nz_2/2$ represents coordinate data at the lower edge of the panorama operation area 6B.

To obtain the tilt angle $\beta$ with the coordinate data t, since the following relation is satisfied, $$(TragMax - \beta):(TragMax - TragMin) = (Nz_2/2 - t):Nz_2$$

the tilt angle $\beta$ is expressed as follows.

$$\beta = TragMax - (TragMax - TragMin) \times (Nz_2/2 - t)/Nz_2$$

Figure 8A:
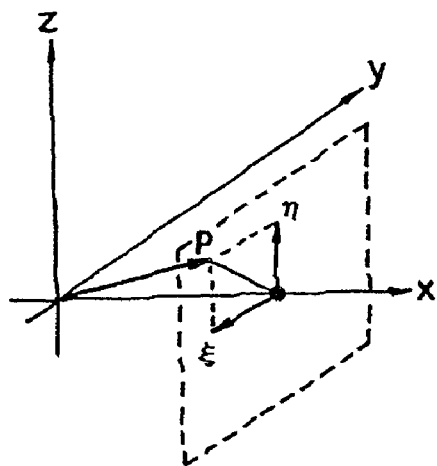
FIGS. 8A and 8B are schematic diagrams for explaining a plane-spherical surface converting method according to the embodiment of the present invention.

Next, with reference to FIGS. 8A and 8B, the method for converting a plane into a spherical surface will be described. As shown in FIG. 8A, the spatial coordinates of a point ($\xi$, $\eta$) of a photographed picture orienting the home position (the origin of latitude and longitude) are expressed as follows.

$$P = \theta_x + k_1 \xi \theta_\xi + k_2 \eta \theta_n$$

$$= \begin{bmatrix} 1 \\ 0 \\ 0 \end{bmatrix} + k_1 \xi \begin{bmatrix} 0 \\ 1 \\ 0 \end{bmatrix} + k_2 \eta \begin{bmatrix} 0 \\ 0 \\ 1 \end{bmatrix}$$

$$= \begin{bmatrix} 1 \\ -k_1 \xi \\ k_2 \eta \end{bmatrix}$$

At this point, the following relations are satisfied.

$$k_1 = \tan(\lambda/2\gamma)/(Ny/2)$$

$$k_2 = \tan(\mu/2r)/(Nz/2)$$

where (Ny, Nz) represent the drive ranges (y direction and z direction) of the mouse pointer of the pointing device 14 (mouse 8); ($\lambda$, $\mu$) represents the horizontal angle of view and vertical angle of view at the wide edge; and γ represents the current zoom relative magnification (magnification information) assuming that the wide edge is one time (×1).

Figure 8B:
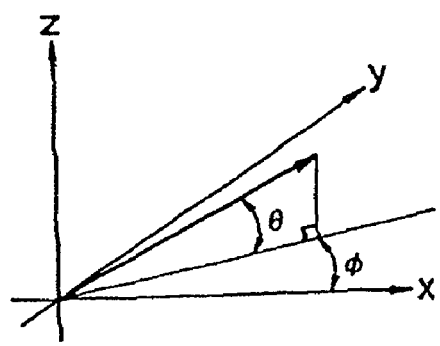

In addition, as shown in FIG. 8B, a three-dimensional rotation matrix is generally expressed as follows.

$$Ry(\phi) = \begin{bmatrix} \cos\phi & 0 & -\sin\phi \\ 0 & 1 & 0 \\ \sin\phi & 0 & \cos\phi \end{bmatrix}$$

$$Rz(\theta) = \begin{bmatrix} \cos\theta & -\sin\theta & 0 \\ \sin\theta & \cos\theta & 0 \\ 0 & 0 & 1 \end{bmatrix}$$

Since the direction of one point (ξ, η) of a photographed picture that is panned and tilted by angular information (θ, φ) from the home position is the same as the direction of one point (α, β) apart from the home position, the following relation is satisfied.

$$R_z(\theta)R_y(\phi)p = 1R_z(\alpha)R_y(\beta)e_x$$

When the formula is solved with respect to p, the following relation is satisfied.

$$p = IR_y(-\phi)R_x(\alpha-\theta)R_y(\beta)e_x \quad (3)$$

$$= I \begin{bmatrix} \cos(\alpha-\theta)\cos\phi\cos\beta + \sin\phi\sin\beta \\ \sin(\alpha-\theta)\cos\beta \\ -\cos(\alpha-\theta)\sin\phi\cos\beta + \cos\phi\sin\beta \end{bmatrix}$$

$$p = I \begin{bmatrix} a \\ b \\ c \end{bmatrix}$$

Thus, ξ and η are obtained as follows.

$$1 = 1/a$$

$$\xi = -1b/k_1 = -b/k_{1a}$$

$$\eta = 1c/k_2 = c/k_{2a}$$

With the above formula, (ξ, η) projected to the photograph coordinates can be obtained with coordinate data with an angle (α, β) from the home position.

$$\xi = (-\sin(\alpha-\theta)\cos\beta)/(k_1(\cos(\alpha-\theta)\cos\phi\cos\beta + \sin\phi\sin\beta))$$

$$\eta = (-\cos(\alpha-\theta)\sin\phi\cos\beta + \cos\phi\sin\beta)/(k_2(\cos(\alpha-\theta)\cos\phi\cos\beta + \sin\phi\sin\beta))$$

Coordinate data (ξ, η) on the obtained picture by the pan tilter camera 3 can be obtained from angular coordinates (α, β) on the virtual spherical surface corresponding to coordinate (s, t) of a panorama picture. Thus, a panorama picture can be generated.

In contrast, coordinate data with an angle (α, β) can be obtained with (ξ, η) projected to photograph coordinates corresponding to the following formula.

Since 1=|p|

$$a = 1/\sqrt{(1+k_1^2\xi^2+k_2^2\eta^2)}$$

$$b = -k_1\xi/\sqrt{(1+k_1^2\xi^2+k_2^2\eta^2)}$$

$$c = k_2\eta/\sqrt{(1+k_1^2\xi^2+k_2^2\eta^2)}$$

where √( ) represents that the square root of the calculated result in ( ) is obtained.

Form Formula (3), the following relations are satisfied.

$$a = \cos(\alpha-\theta)\cos\phi\cos\beta + \sin\phi\sin\beta$$

$$b = \sin(\alpha-\theta)\cos\beta$$

$$c = -\cos(\alpha-\theta)\sin\phi\cos\beta + \cos\phi\sin\beta$$

Thus, the following relations are satisfied.

$$a\sin\phi + c\sin\theta = \sin\beta$$

$$\tan(\alpha-\theta) = b/(a\cos\phi - c\sin\theta)$$

Thus, the following relations are satisfied.

$$\beta = \sin^{-1}(\sin\phi/\sqrt{(1+k_1^2\xi^2+k_2^2\theta^2)} + \sin\theta k_2\theta/\sqrt{(1+k_1^2\xi^2+k_2^2\eta^2)})$$

$$\alpha = \tan^{-1}(-k_1\xi/(\cos\phi - k_2\eta\sin\theta)) + \theta$$

Thus, the pan angle α and the tilt angle β can be obtained as follows.

$$(\alpha,\beta) = (f(\xi,\eta,\theta,\gamma), g(\xi,\eta,\theta,\phi,\gamma)) \quad (4)$$

If an error is permitted to some extent, (α, β) can be expressed as follows.

$$\alpha = \theta + (\lambda/\gamma) \times (\xi/Ny)$$

$$\beta = \phi + (\mu/\gamma) \times (\eta/Nz)$$

In other words, Eq. (4) can be simplified as follows.

$$(\alpha,\beta) = (f(\xi,\theta,\gamma), g(\eta,\phi,\gamma)) \quad (5)$$

Next, with reference to FIG. 9, a method for calculating angular information (α, β) of the pan tilter 28 expressed by Eq. (4) and Eq. (5) with positional coordinates (ξ, η) of the operation area 6A will be described. First of all, an example of a method for directly designating a desired point in the operation area 6A will be described. Assuming that the center of the operation area 6A is defined as (0, 0) of relative coordinates as shown in FIG. 9A, the positional coordinates (ξ, η) of the mouse pointer of the mouse 8 in the operation area 6A are obtained.

Next, another method for designating a desired point generated with a desired area in the operation area 6A will be described. As shown in FIG. 9A, after a start point (m1, n1) in a desired area is designated, an end point (m2, n2) in the desired area is designated. As the coordinates at the center of the rectangle generated with these two points, a desired point (ξ, η) is obtained as Eq. (6).

$$(\xi,\eta) = (m1,n1) + (m2,n2))/2 \quad (6)$$

FIG. 9A shows coordinates of the mouse 8 (pointing device 14) in the operation area 6A. In FIG. 9A, the moving range (y direction and z direction) of the mouse pointer of the mouse 8 in the operation area 6A is denoted by (Ny$_1$, Nz$_1$). Angular coordinates (α, β) of the pan tilter 28 are obtained with positional coordinates (ξ, η) of the desired point (at the mouse pointer of the mouse 8), angular information (θ, φ) that represents the orientation of the pan tilter 28, and magnification information (γ) of the current zoom relative magnification assuming that the wide edge of the zoom lens 16 is defined as one magnification corresponding to Eq. (4) or Eq. (5).

The angular coordinates (α, β) shown in FIG. 9B are used to place a position designated by the pointing device to the center of the photographed screen assuming that the home position of the pan tilter 28 is defined as the origin of latitude and longitude.

The coordinates obtained in FIGS. 9A and 9B may be absolute coordinates of the screen of the monitor 2 or relative coordinates assuming that the center of the operation area 6A is defined as (0, 0). In the coordinates shown in FIGS. 9A and 9B, coordinates in the pan direction are represented by ξ, m1, m2, θ, and α and coordinates in the tilt direction are represented by η, n1, n2, φ, and β.

Figure 11A:
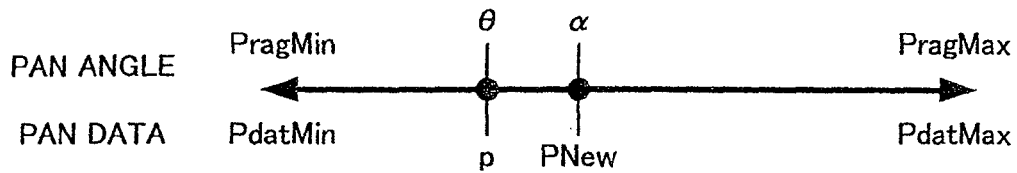
FIGS. 11A and 11B are schematic diagrams for explaining positional information and angular information of a pan tilter camera according to the embodiment of the present invention.
Figure 11B:
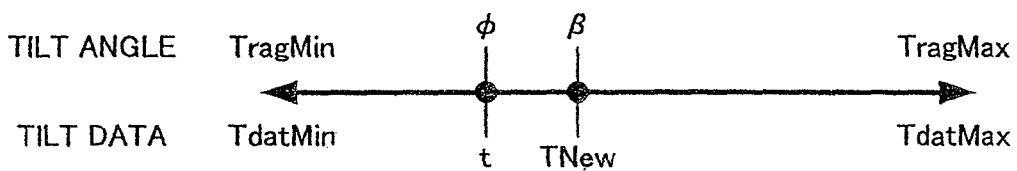

Thus, when the mouse pointer of the mouse 8 is present in the operation area 6A, the angular information (α, β) of the pan titter 28 is calculated with the angular information (θ, φ) of the current pan tilter 28 obtained with received data, the zoom magnification information (γ), and the positional information (ξ, η) at the mouse pointer of the mouse 8 corresponding to Eq. (4) or Eq. (5) so that the designated object is placed at the center of the operation area 6A. The angular coordinates (α, β) of the pan tilter 28 are converted into internal positional information (PNew, TNew) as shown in FIGS. 11A and 11B. The resultant internal positional information (PNew, TNew) is stored in a send buffer along with an absolute position drive command of the pan tilter 28. In addition, as will be described later, a data send request flag (FlagSo) is set so that data is sent upon occurrence of a timer event.

Next, with reference to FIGS. 10A, 10B, and 10C, a method for converting positional coordinates (ξ, η) of the mouse pointer of the mouse 8 in the panorama operation area 6B of the panorama picture into angular coordinates (α, β) corresponding to the present invention will be described. As with the method for directly designating a desired point in the operation area 6A, as shown in FIG. 10A, with a method for directly designating a desired point in the panorama operation area 6B, positional coordinates (ξ, η) at the mouse pointer of the mouse 8 can be obtained.

Next, another method for designating a desired point generated with a desired area in the panorama operation area 6B will be described. As shown in FIG. 10A, after a start point (m1, n1) of a desired area is designated, the end point (m2, n2) of the desired area are designated. Corresponding to Eq. (6), a desired point (ξ, η) is obtained.

Figure 10A:
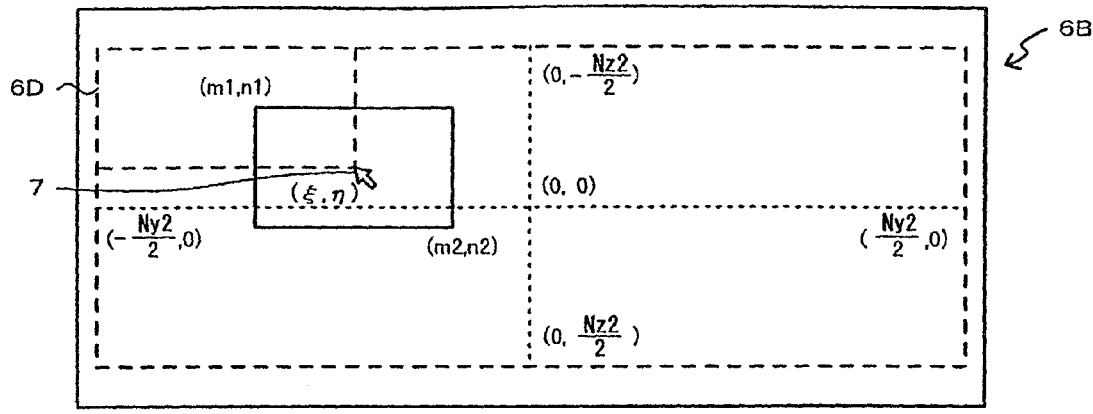
FIGS. 10A to 10C are schematic diagrams for explaining a coordinate converting method in the panorama operation area according to the embodiment of the present invention.

In FIG. 10A, the moving range (y direction and z direction) of the mouse pointer of the mouse 8 in the panorama operation area 6B (the moving range is defined as the coordinates of the mouse pointer of the mouse 8 (pointing device 14) in the panorama operation area 6B) is represented by ($Ny_2$, $Nz_2$). The moving range is limited by the pan tilter limiter 6D denoted by dotted lines in the panorama operation area 6B. The pan tilter limiter 6D represents the moving range of the optical axis of the lens of the pan tilter camera 3. In other words, a point cannot be designated out of the pan tilter limiter 6D. Positional coordinates (x, y) in the panorama operation area 6B, angle-of-view information (s, t), and angular information (α, β) of the pan tilter 28 can be obtained with the positional coordinates (ξ, η) of the desired point, the angular information (θ, φ) representing the orientation of the pan tilter 28, and the magnification information (γ) as the current zoom relative magnification assuming that the wide edge of the zoom lens 16 is defined as one magnification corresponding to Eq. (7), Eq. (8), and Eq. (9).

$$(x,y)=(f_0(\theta),g_0(f)) \quad (7)$$

$$(s,t)=(f_1(\gamma),g_1(\gamma)) \quad (8)$$

$$(\alpha,\beta)=(f(\xi),g(\eta)) \quad (9)$$

Figure 10B:
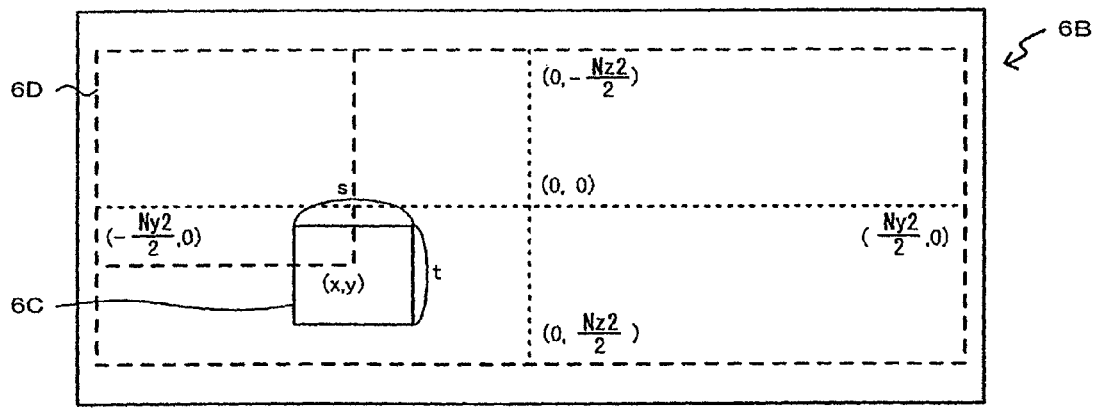

In FIG. 10B, positional coordinates (x, y) represent the current orientation of the pan tilter 28 assuming that the home position of the pan tilter 28 is defined as the origin of latitude and longitude. Angle-of-view information (s, t) is the current angle of view in the operation area 6A. FIG. 10B represents the states of the zoom lens and the pan tilter in the panorama operation area 6B.

Figure 10C:
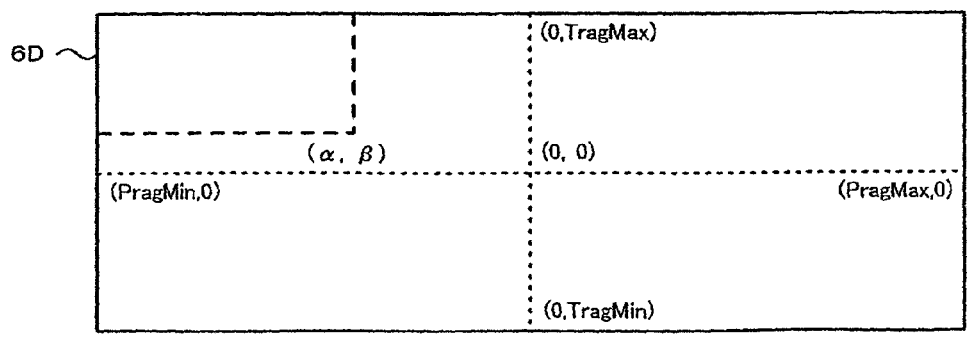

In FIG. 10C, angular coordinates (α, β) are used to place the position designated by the pointing device to the center of the photographed screen assuming that the home position of the pan tilter 28 is defined as the origin of latitude and longitude. (PragMax, TragMax) and (PragMin, TragMin) represent the moving range of the pan tilter (namely, the range represented by the pan tilter limiter 6D). FIG. 10C shows a drive target value in the pan tilter moving range.

In FIGS. 10A, 10B, and 10C, coordinates to be obtained may be absolute coordinates on the screen of the monitor 2 or relative coordinates assuming that the center of the panorama operation area 6B is defined as (0, 0). In the coordinates, coordinates in the pan direction are represented by ξ, m1, m2, x, s, and α and coordinates in the tilt direction are represented by η, n1, n2, y, t, and β.

Thus, when the mouse pointer of the mouse 8 is present in the panorama operation area 6B, angular information (α, β) of the pan tilter 28 is calculated with positional information (ξ, η) at the mouse pointer of the mouse 8 corresponding to Eq. (9) so that the designated object in the operation area 6A is placed at the center of the operation area 6A. Angular coordinates (α, β) of the pan tilter 28 are converted into internal positional information (PNew, TNew) of the pan tilter 28 corresponding to the method shown in FIGS. 11A and 11B. The internal positional information (PNew, TNew) of the pan tilter 28 is stored in a send buffer along with an absolute position drive command of the pan tilter 28. In addition, as will be described later, a data send request flag (FlagSo) is set so that data is sent upon occurrence of the timer event.

Next, a method for converting internal positional information (α, β) of the pan tilter 28 into angular information (α, β) and a method for converting angular coordinates (α, β) into internal positional information (PNew, TNew) of the pan tilter 28 will be described with reference to FIGS. 11A and 11B. In FIG. 11A, PragMin represents angular data at the left edge assuming that the home position of the pan tilter 28 is 0 (reg). PragMax represents angular data at the right edge assuming that the home position of the pan tilter 28 is 0 (rag). PdatMin represents internal count data at the left edge of the pan tilter controller 25. PdatMax represents internal counter data at the right edge of the pan tilter controller 25.

To obtain the pan angle θ with the pan data p, since the following relation is satisfied, (PragMax−θ):(PragMax−PragMin)=
  (PdatMax−p):(PdatMax−PdatMin)

the pan angle θ is expressed as follows.

θ=PragMax−(PragMax−PragMin)×
  (PdatMax−p)/(PdatMax−PdatMin)

Thus, the pan data p is expressed as follows.

p=PdatMax−(PragMax−θ)×
  (PdatMax−PdatMin)/(PragMax−PragMin)

In addition, to obtain the pan data PNew with the pan angle α, since the following relation is satisfied, (PragMax−α):(PragMax−PragMin)=
  (PdatMax−p-new):(PdatMax−PdatMin)

the pan data PNew is expressed as follows.

PNew=PragMax−(PragMax−α)×
  (PdatMax−PdatMin)/(PragMax−PragMin)

In FIG. 11B, TragMin represents angular data at the upper edge assuming that the home position of the pan tilter 28 is 0 (rag). TragMax represents angular data at the lower edge assuming that the home position of the pan tiler 28 is 0 (rag). TdatMin represents internal count data at the upper edge of the pan tilter controller 25. TdatMax represents internal count data at the lower edge of the pan tilter controller 25.

To obtain the tilt angle ϕ with the tilt data t, since the following relation is satisfied, $$(TragMax-\phi):(TragMax-TragMin)= (TratMax-t):(TdatMax-TdatMin)$$

the tilt angle ϕ is expressed as follows.

$$\phi=TragMax-(TragMax-TragMin)\times (TdatMax-t)/(TdatMax-TdatMin)$$

Thus, the tilt data t is expressed as follows.

$$t=TdatMax-(TragMax-\theta)\times (TdatMax-TdatMin)/(TragMax-TragMin)$$

To obtain the tilt data TNew with the tilt angle β, since the following relation is satisfied, $$(TragMax-\beta):(TragMax-TragMin)= (TdatMax-t):(TdatMax-TdatMin)$$

the tilt data TNew is expressed as follows.

$$TNew=TragMax-(TragMax-\beta)\times (TdatMax-TdatMin)/(TragMax-TragMin)$$

Figure 12A:
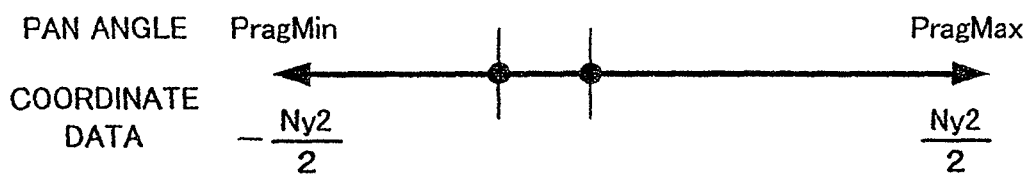
FIGS. 12A and 12B are schematic diagrams for explaining angular coordinates of the pan tilter camera and positional coordinates in the panorama operation area according to the embodiment of the present invention.

Next, with reference to FIGS. 12A and 12B, a method for converting positional coordinates (ξ, η) in the panorama operation area 6B into angular coordinates (α, β) of the pan tilter 28 and a method for converting angular information (θ, ϕ) of the pan tilter 28 into positional coordinates (x, y) in the panorama operation area 6B will be described. In FIG. 12A, PragMin represents angular data at the left edge assuming that the home position of the pan tilter 28 is 0 (rag). PragMax represents angular data at the right edge assuming that the home position of the pan tilter 28 is 0 (rag). $Ny_2$ represents a horizontal coordinate of the panorama operation area 6B. $-Ny_2/2$ represents coordinate data at the left edge of the panorama operation area 6B. $Ny_2/2$ represents coordinate data at the right edge of the panorama operation area 6B.

To obtain the pan angle α with the coordinate data ξ, since the following relation is satisfied, $$(PragMax-\alpha):(PragMax-PragMin)=(Ny_2/2-\xi):Ny_2$$

the pan angle α is expressed as follows.

$$\alpha=PragMax-(PragMax-PragMin)\times(Ny_2/2-\xi)/Ny_2$$

To obtain the coordinate data x with the pan angle θ, since the following relation is satisfied, $$(PragMax-\theta):(PragMax-PragMin)=(Ny_2/2-x):Ny_2$$

the coordinate data x is expressed as follows.

$$x=Ny_2/2-(PragMax-\theta)\times Ny_2/(PragMax-PragMin)$$

Figure 12B:
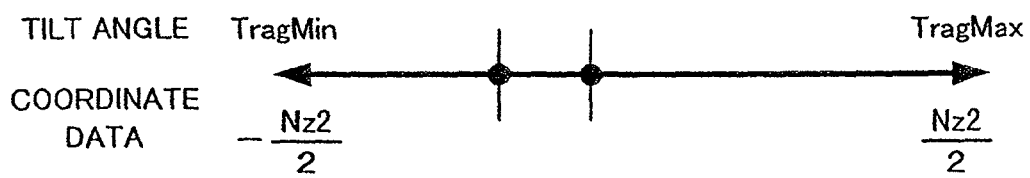

In FIG. 12B, TragMin represents angular data at the upper edge assuming that the home position of the pan tilter 28 is 0 (rag). TragMax represents angular data at the lower edge assuming that the home position of the pan tilter 28 is 0 (rag). $Nz_2$ represents a vertical coordinate of the panorama operation area 6B. $-Nz_2/2$ represents coordinate data at the upper edge of the panorama operation area 6B. $Nz_2/2$ represents coordinate data at the lower edge of the panorama operation area 6B.

To obtain the tilt angle β with the coordinate data η, since the following relation is satisfied, $$(TragMax-\beta):(TragMax-TragMin)=(Nz_2/2-\eta):Nz_2$$

the tilt angle β is expressed as follows.

$$\beta=TragMax-(TragMax-TragMin)\times(Nz_2/2-\eta)/Nz_2$$

To obtain the coordinate data y with the tilt angle ϕ, since the following relation is satisfied, $$(TragMax-\phi):(TragMax-TragMin)=(Nz_2/2-y):Nz_2$$

the coordinate data y is expressed as follows.

$$y=Nz_2/2-(TragMax-\theta)\times Nz_2/(TragMax-TragMin)$$

Figure 13A:
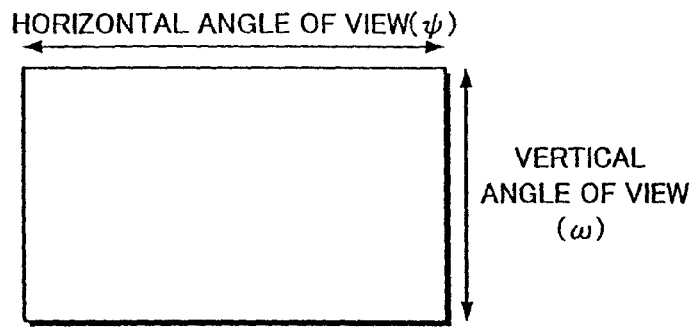
FIGS. 13A to 13D are schematic diagrams for explaining the angle of view of the pan tilter camera and a frame in the panorama operation area according to the embodiment of the present invention.

Next, with reference to FIGS. 13A to 13D, a method for converting angle-of-view information (ψ, ω) captured by the pan tilter 28 into angle-of-view information (θ, t) of the frame 6C in the panorama operation area 6B will be described. FIG. 13A shows the current angle-of-view information (ψ, ω) of the pan tilter 28. The angle-of-view information (ψ, ω) is expressed as follows.

$$(\psi,\omega)=1/\gamma\times(\psi 0,\omega 0)$$

At this point, (ψ0, ω0) represent the horizontal angle of view and the vertical angle of view at the wide edge. λ represents the magnification of the lens assuming that the wide edge is defined as one magnification.

Figure 13B:
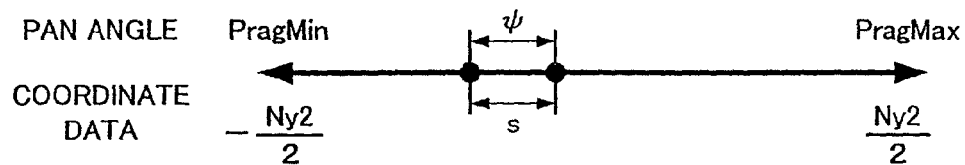

As shown in FIG. 13B, PragMin represents angular data at the left edge assuming that the home position of the pan tilter 28 is 0 (rag). PragMax represents angular data at the right edge assuming that the home position of the pan tilter 28 is 0 (rag). $Ny_2$ represents a horizontal coordinate of the panorama operation area 6B. $-Ny_2/2$ represents coordinate data at the left edge of the panorama operation area 6B. $Ny_2/2$ represents coordinate data at the right edge of the panorama operation area 6B.

To obtain the horizontal angle of view s with the horizontal angle of view ψ, since the following relation is satisfied, $$\psi:(PragMax-PragMin)=s:Ny_2$$

horizontal angle of view s is expressed as follows.

$$s=\psi\times Ny_2/(PragMax-PragMin)$$

Figure 13C:
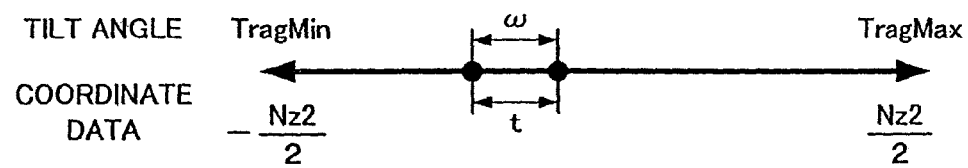

In FIG. 13C, TragMin represents angular data at the lower edge assuming that the home position of the pan tilter 28 is 0 (rag). TragMax represents angular data at the upper edge assuming that the home position of the pan tilter 28 is 0 (rag). $Nz_2$ represents a vertical coordinate of the panorama operation area 6B. $-Nz_2/2$ represents coordinate data at the lower edge of the panorama operation area 6B. $Nz_2/2$ represents coordinate data at the upper edge of the panorama operation area 6B.

To obtain the vertical angle of view t with the vertical angle of view ω, since the following relation is satisfied, $$\omega:(TragMax-TragMin)=t:Nz_2$$

the vertical angle of view t is expressed as follows.

$$t=\omega\times Nz_2/(TragMax-TragMin)$$

Figure 13D:
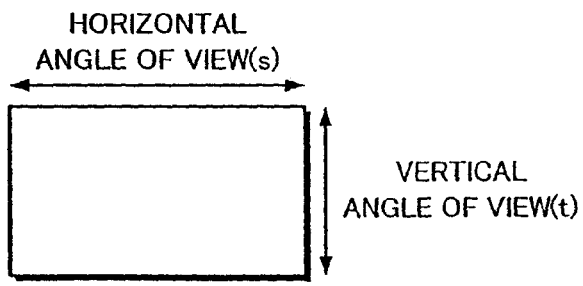

Thus, the angle-of-view information (s, t) shown in FIG. 13D is displayed as the frame 6C in the panorama operation area 6B.

Figure 14:
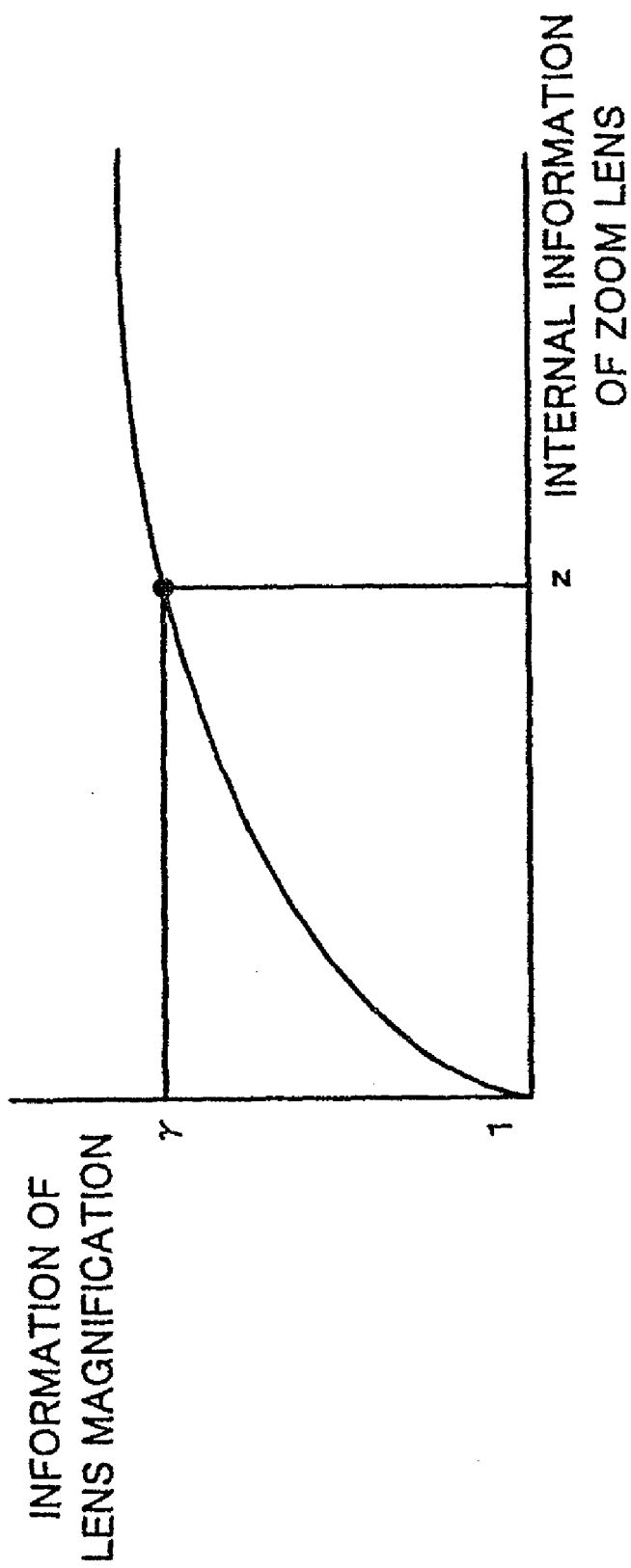
FIG. 14 is a graph for explaining a conversion method of zoom data and magnification data according to the embodiment of the present invention.

Next, with reference to FIG. 14, a method for converting the positional information (z) of the zoom lens 16 into magnification information (γ) will be described. In FIG. 14, the vertical axis represents information of lens magnification, whereas the horizontal axis represents the internal information of zoom lens. The positional information (z) of the zoom lens 16 is converted into the magnification information (γ) by the computer 1 corresponding to a conversion graph shown in FIG. 14. For example, the positional information (z) is converted into the magnification information (γ) corresponding to a ROM table or an equation.

Figure 15:
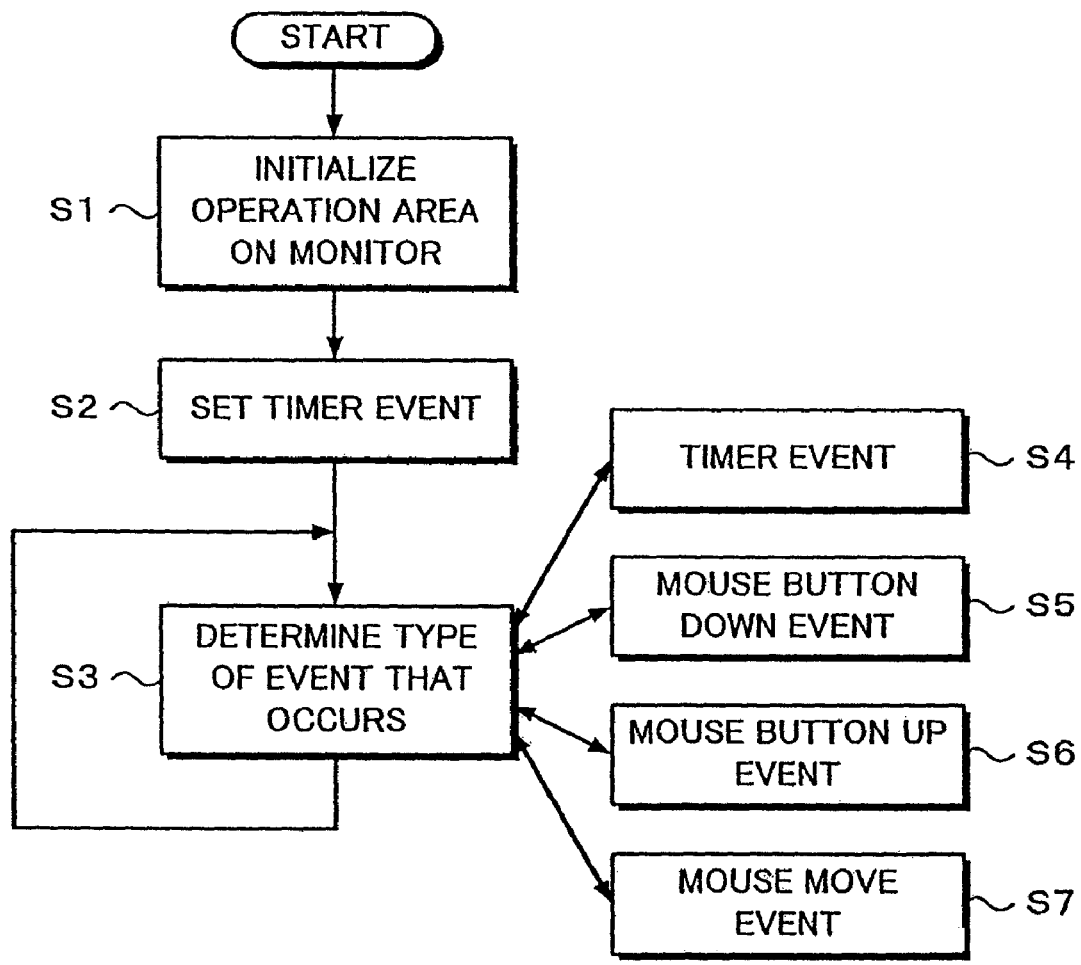
FIG. 15 is a flow chart showing an example of the overall process according to the embodiment of the present invention.

Next, with reference to FIG. 15, an example of a control algorithm of the computer 1 will be described. When the program is executed, the flow advance to step S1. At step S1, the operation area 6, the panorama operation area 6B, the cursor 7, and the pan tilter limiter 6D are initialized and displayed on the monitor 2 as shown in FIG. 2. The range of the pan tilter limiter 6D may be fixed or variable. At step S2, a timer is set so that the computer 1 communicates with the mode controller 23 at predetermined intervals. After such initial setup operations have been completed, the flow advances to step S3. At step S3, the system waits for an occurrence of an event. Corresponding to an event that occurs, the flow advances to a relevant step (for example, a timer event (at step S4), a mouse button down event (at step S5), a mouse button up event (at step S6), and a mouse move event (at step S7)).

Figure 16A:
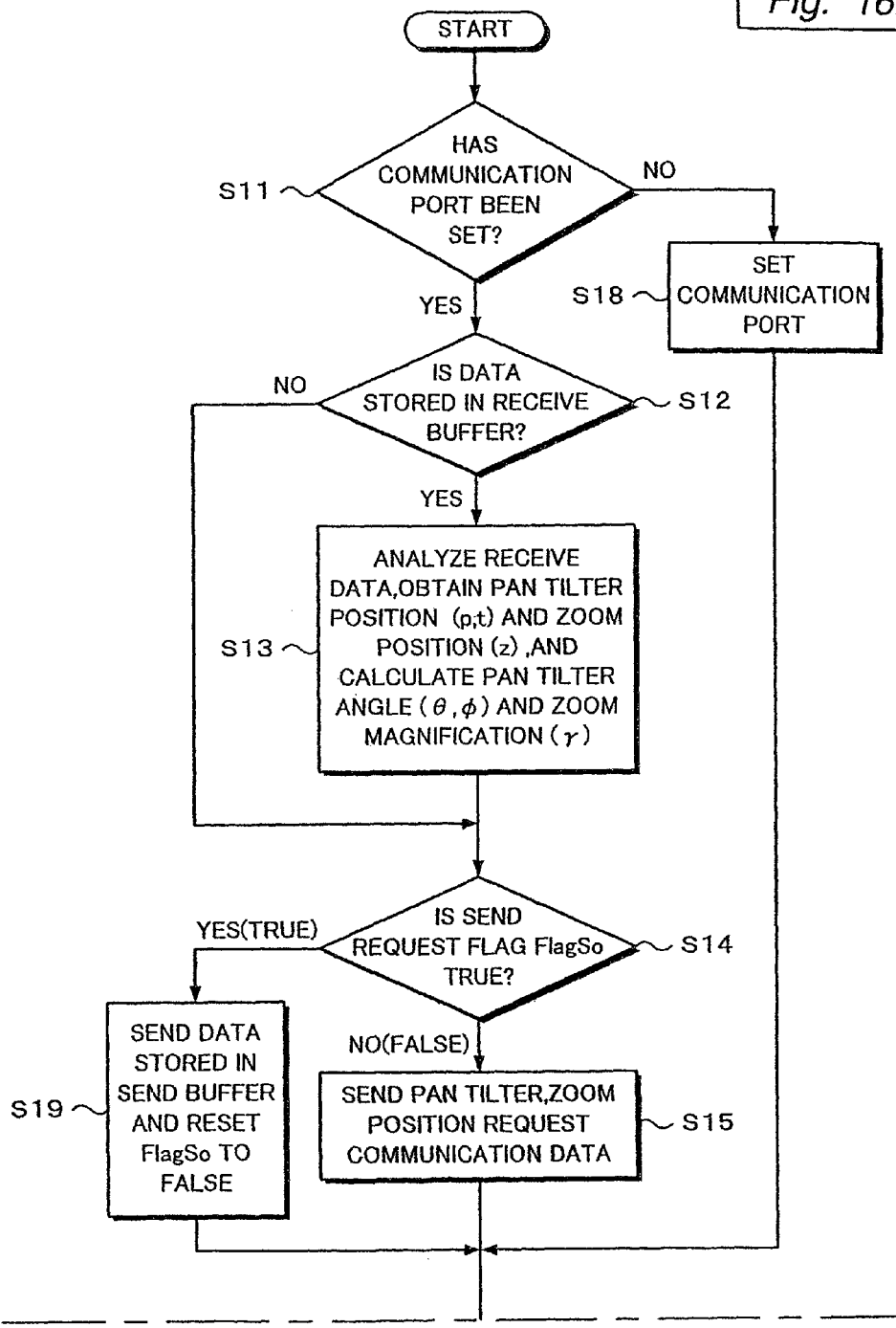
FIGS. 16A and 16B are flow charts showing an example of the process of a timer event according to the embodiment of the present invention.
Figure 16B:
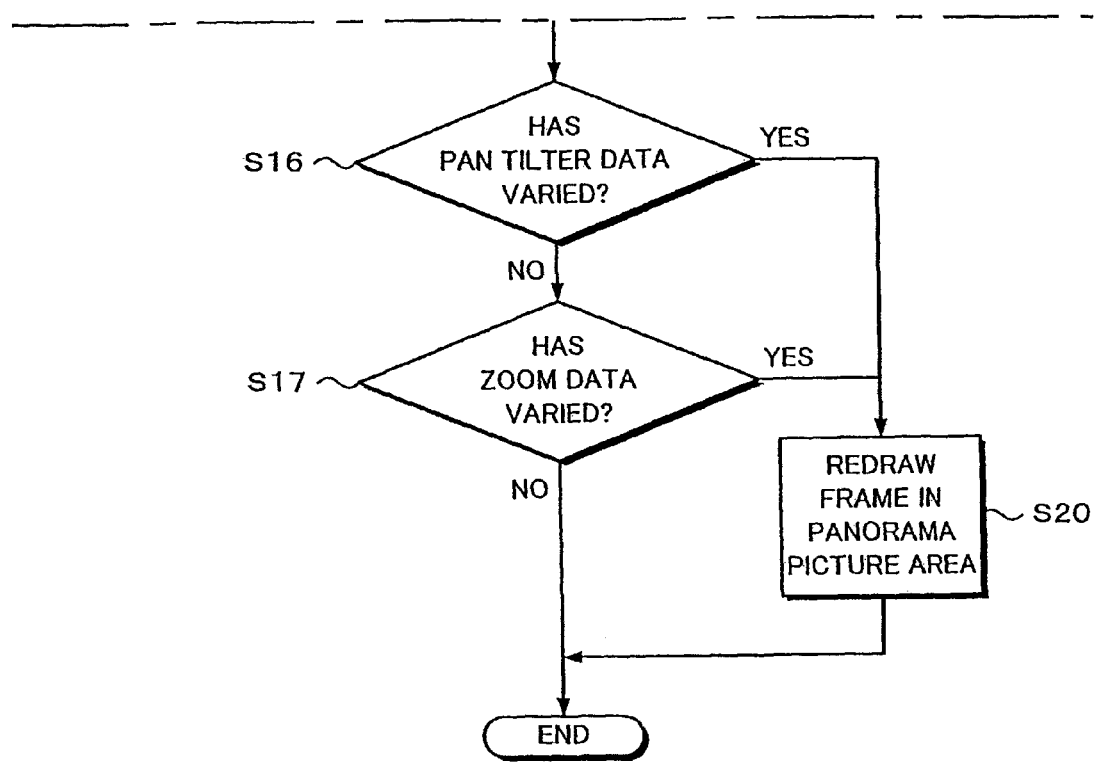

Next, with reference to a flow chart shown in FIGS. 16A and 16B, the algorithm of the timer event will be described. The timer event is an event for causing the computer 1 to communicate with the mode controller 23 at predetermined intervals. The timer event occurs at intervals of for example 50 msec. When the timer event occurs, the flow advances to step S11. At step S11, the system determines whether or not a communication port has been set. When the communication port has been set (namely, the determined result at step S11 is Yes), the flow advances to step S12. When the communication port has not been set (namely, the determined result at step S11 is No), the flow advances to step S18. At the first time the communication port has not been set, the flow advances to step S18. At step S18, the system opens the communication port. Actually, at step S18, the system opens an RS-232C port of the computer 1. Thereafter, the flow advances to step S16.

Thereafter, in the timer event, the system performs a receive data checking process, an analyzing process, a data sending process for data stored in the send buffer (such as the drive command for the pan tilter 28), and/or a communication data sending process for state check requests for the pan tilter 28 and the zoom lens 16. In this algorithm, the flow advances from step S11 to step S12. At step S12, the system determines whether or not data is stored in the receive buffer. When data is stored in the receive buffer (namely, the determined result at step S12 is Yes), the flow advances to step S13. When data is not stored in the receive buffer (namely, the determined result at step S12 is No), the flow advances to step S14. At step S13, the system analyzes receive data stored in the receive buffer and obtains positional information (p, t) of the pan tilter 28 and positional information (z) of the zoom lens 16 that have been requested to the mode controller 23. The system converts the positional information (p, t) of the pan tilter 28 and the positional information (z) of the zoom lens 16 into angular information ($\theta$, $\phi$) of the pan tilter 28 and magnification information ($\gamma$) of the zoom lens 16 corresponding to methods shown in FIGS. 11 and 14.

At step S14, the system determines whether or not a data send request has been issued. When a data send request has been issued (FlagSo==True) (namely, the determined result at step S14 is Yes), the flow advances to step S19. At step S19, the system sends data stored in the send buffer and resets the send request flag (FlagSo==False). Next, the flow advances to step S16. An example of data stored in the send buffer is data of a drive command of the pan tilter 28 designated with the mouse 8. When a send request has not been issued (FlagSo==False) (namely, the determined result at step S14 is No), the flow advances to step S15. At step S15, the system sends position request commands for the pan tilter 28 and the zoom lens 16 from the computer 1 to the mode controller 23.

At step S16, the system compares the old positional information of the pan tiler 28 with the new positional information thereof and determines whether or not the positional information (p, t) has varied. When the positional information (p, t) of the pan tilter 28 has varied (namely, the determined result at step S16 is Yes), the flow advances to step S20. When the positional information (p, t) of the pan tilter 28 has not varied (namely, the determined result at step S16 is No), the flow advances to step S17. At step S17, the system compares the old positional information of the zoom lens 16 with the new positional information thereof and determines whether or not the positional information (z) has varied. When the positional information (z) of the zoom lens 16 has varied (namely, the determined result at step S17 is Yes), the flow advances to step S20. When the positional information (z) of the zoom lens 16 has not varied (namely, the determined result at step S17 is No), this event is completed.

At step S20, when the positional information (p, t) of the pan tilter 28 and/or the positional information (z) of the zoom lens 16 has varied, the system redraws the frame 6C in the panorama operation area 6B. At this point, the system converts the positional information (p, t) of the pan tilter 28 into the angular information ($\theta$, $\phi$). In addition, the system converts the positional information (z) of the zoom lens 16 into the magnification information ($\gamma$). With the converted angular information ($\theta$, $\phi$) and magnification information ($\gamma$), the system calculates positional coordinates (x, y) of the pan tilter 28 and angle-of-view information (s, t) that is the angle of view displayed in the operation area 6A corresponding to Eq. (7) and Eq. (8), respectively. Corresponding to the resultant positional coordinates (x, y) and angle-of-view information (s, t), the system draws the frame 6C in the panorama operation area 6B.

At step S16, the system compares the old positional information (p, t) of the pan tilter 28 with the new positional information (p, t) thereof.

Alternatively, the system may compare the old angular information ($\theta$, $\phi$) of the pan tilter 28 with the new angular information ($\theta$, $\phi$) thereof. In this case, at step S20, with the new angular information ($\theta$, $\phi$), the system calculates the positional coordinates (x, y) corresponding to Eq. (7). Likewise, at step S17, the system compares the old positional information (z) of the zoom lens 16 with the new positional information (z) thereof. Alternatively, the system may compare the old magnification information ($\gamma$) of the zoom lens 16 with the new magnification information ($\gamma$) thereof. In this case, at step S20, the system calculates the angular information (s, t) with the new magnification information ($\gamma$) corresponding to Eq. (8).

Figure 17:
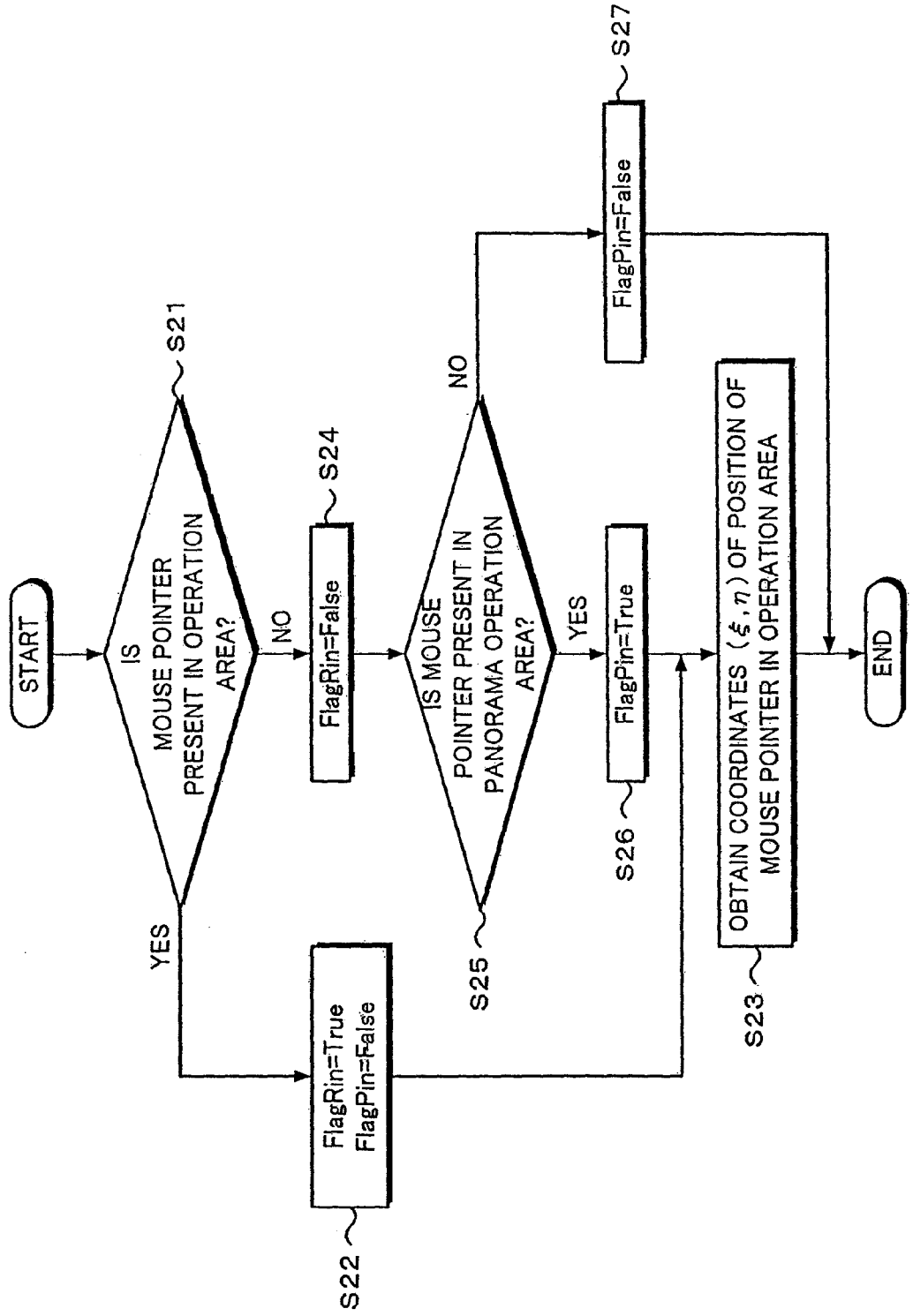
FIG. 17 is a flow chart showing an example of the process of a mouse moving event according to the embodiment of the present invention.

Next, with reference to a flow chart shown in FIG. 17, the algorithm of the mouse move event will be described. The mouse move event is an event that occurs when the mouse 8 is moved. According to the present invention, the mouse move event is used to select a drive position of the pan tilter 28. When the mouse move event occurs, the flow advances to step S21. At step S21, the system determines whether or not the mouse pointer of the mouse 8 is present in the operation area 6A, the panorama operation area 6B, or the other area. When the mouse pointer of the mouse 8 is present in the operation area 6A (namely, the determined result at step S21 is Yes), the flow advances to step S22. When the mouse pointer of the mouse 8 is not present in the operation area 6A (namely, the determined result at step S21 is No), the flow advances to step S24. At step S22, the system sets an operation area flag (Flag-rin==True) and clears a panorama operation area flag (Flag-pin==False).

At step S24, since the mouse pointer of the mouse 8 is not present in the operation area 6A, the system clears the operation area flag (Flag-rin==False). At step S25, the system determines whether or not the mouse pointer of the mouse 8 is present in the panorama operation area 6B. When the mouse pointer of the mouse 8 is present in the panorama operation area 6B (namely, the determined result at step S25 is Yes), the flow advances to step S26. When the mouse pointer of the mouse 8 is not present in the panorama operation area 6B (namely, the determined result at step S25 is. No), the flow advances to step S27. At step S26, the system sets the panorama operation area flag (Flag-pin==True). At step S27, since the mouse pointer of the mouse 8 is not present in the panorama operation area 6B, the system clear the panorama operation area flag (Flag-pin==False).

When the mouse pointer of the mouse 8 is present in the operation area 6A or the panorama operation area 6B (namely, the determined result at step S21 or step S25 is Yes), at step S23, the system obtains positional coordinates ($\xi$, $\eta$) of the mouse pointer of the mouse 8 assuming that the center of the operation area is defined as (0, 0) of relative coordinates.

In this flow chart, when the mouse pointer of the mouse 8 is present in the operation area 6A (namely, the determined result at step S22 is Yes), the system sets the operation area flag (Flag-rin==True). When the mouse pointer of the mouse 8 is not present in the operation area 6A (namely, the determined result at step S22 is No), the system clears the operation area flag (Flag-rin==False). When the mouse pointer of the mouse 8 is present in the panorama operation area 6B (namely, the determined result at step S25 is Yes), the system sets the panorama operation area flag (Flag-pin==True). When the mouse pointer 8 is not present in the panorama operation area 6A (namely, the determined result at step S25 is No), the system clears the panorama operation area flag (Flag-pin==False). When the mouse pointer of the mouse 8 is present in the operation area 6A or the panorama operation area 6B (namely, the determined result at step S21 or S35 is Yes), the system designates the positional coordinates of the mouse pointer of the mouse 8 to ($\xi$, $\eta$) assuming that the center of each operation area is defined as (0, 0) of relative coordinates.

Figure 18:
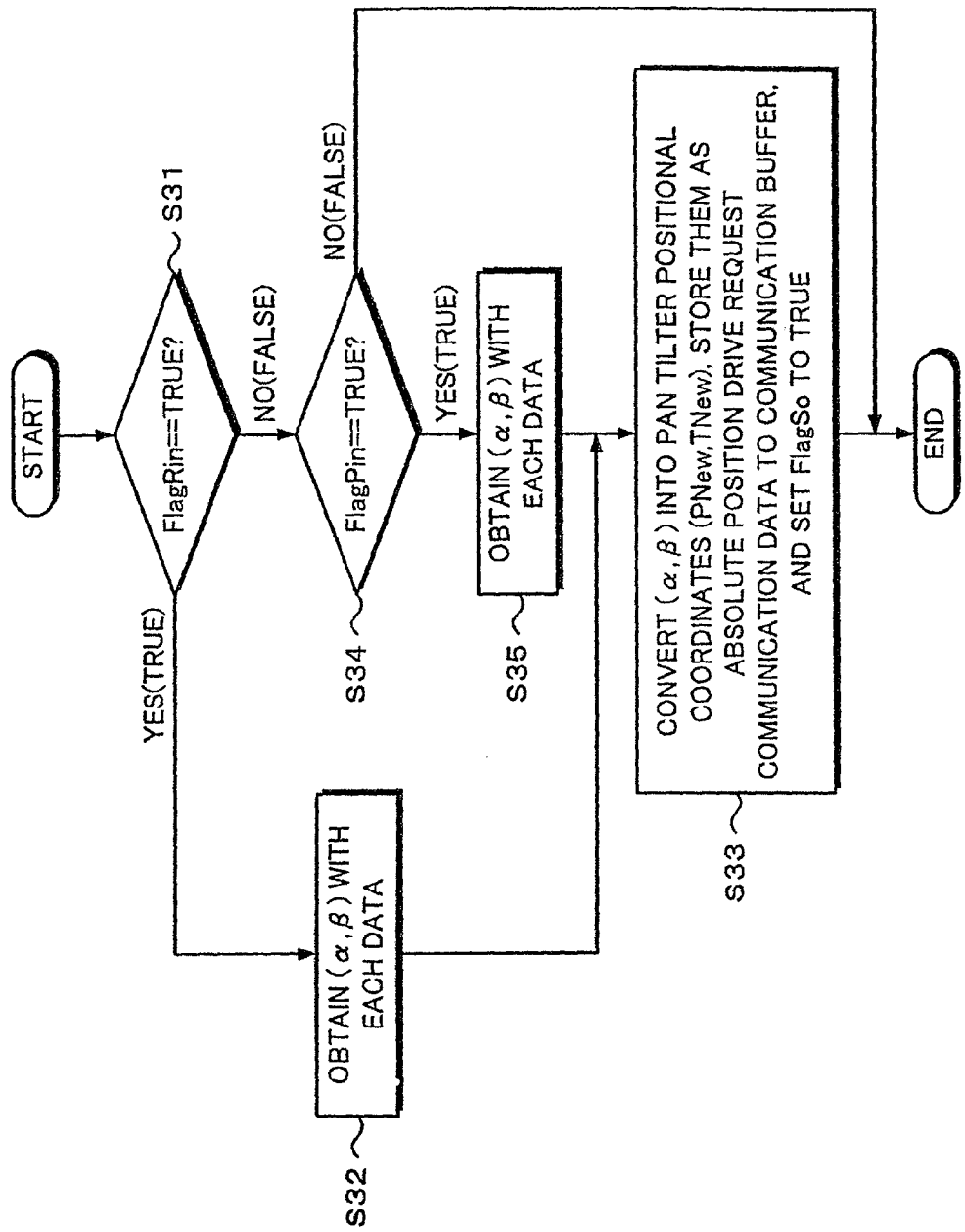
FIG. 18 is a flow chart showing an example of the process of a mouse button down event according to the embodiment of the present invention.
Figure 19:
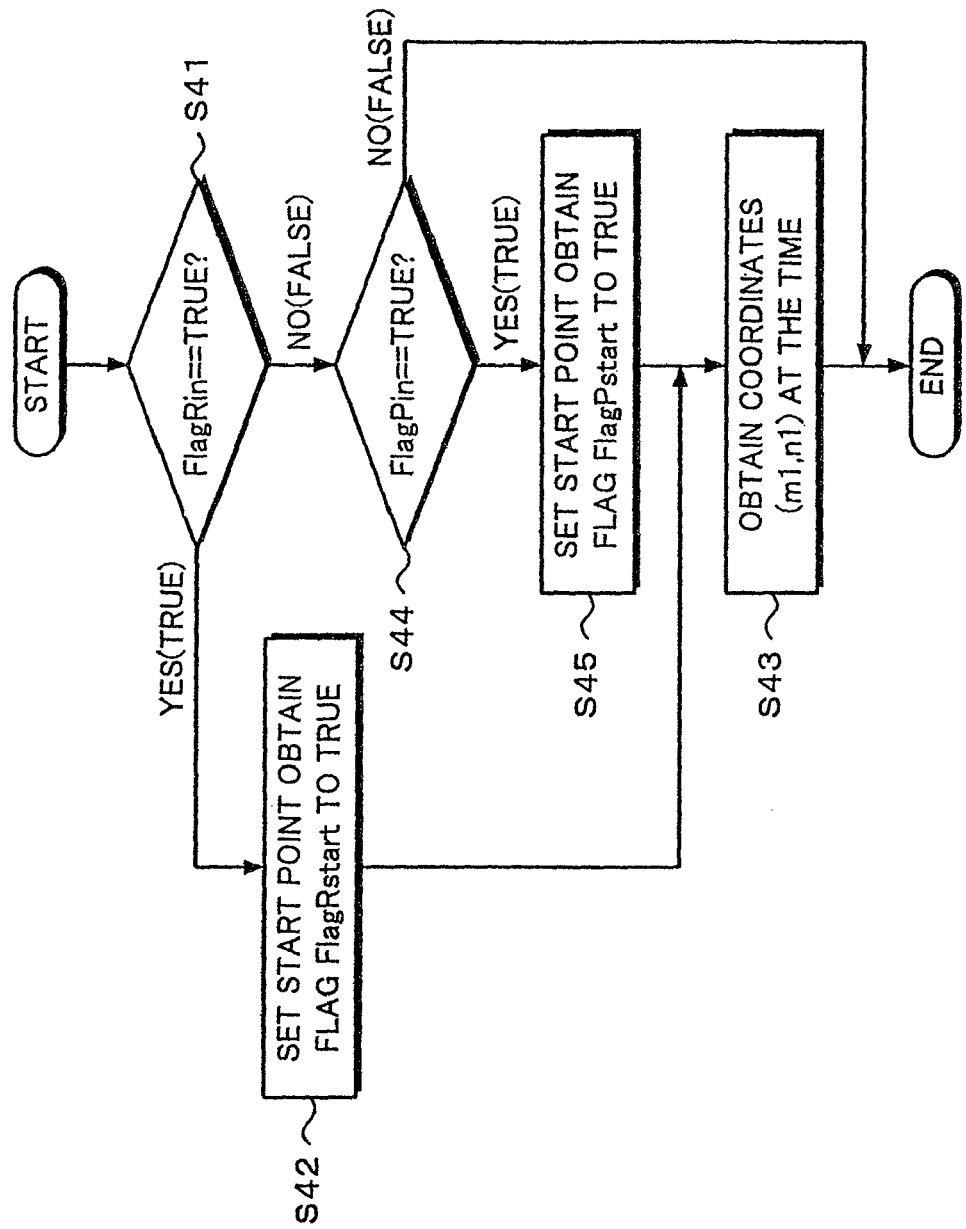
FIG. 19 is a flow chart showing another example of the process of a mouse button down event according to the embodiment of the present invention.
Figure 20:
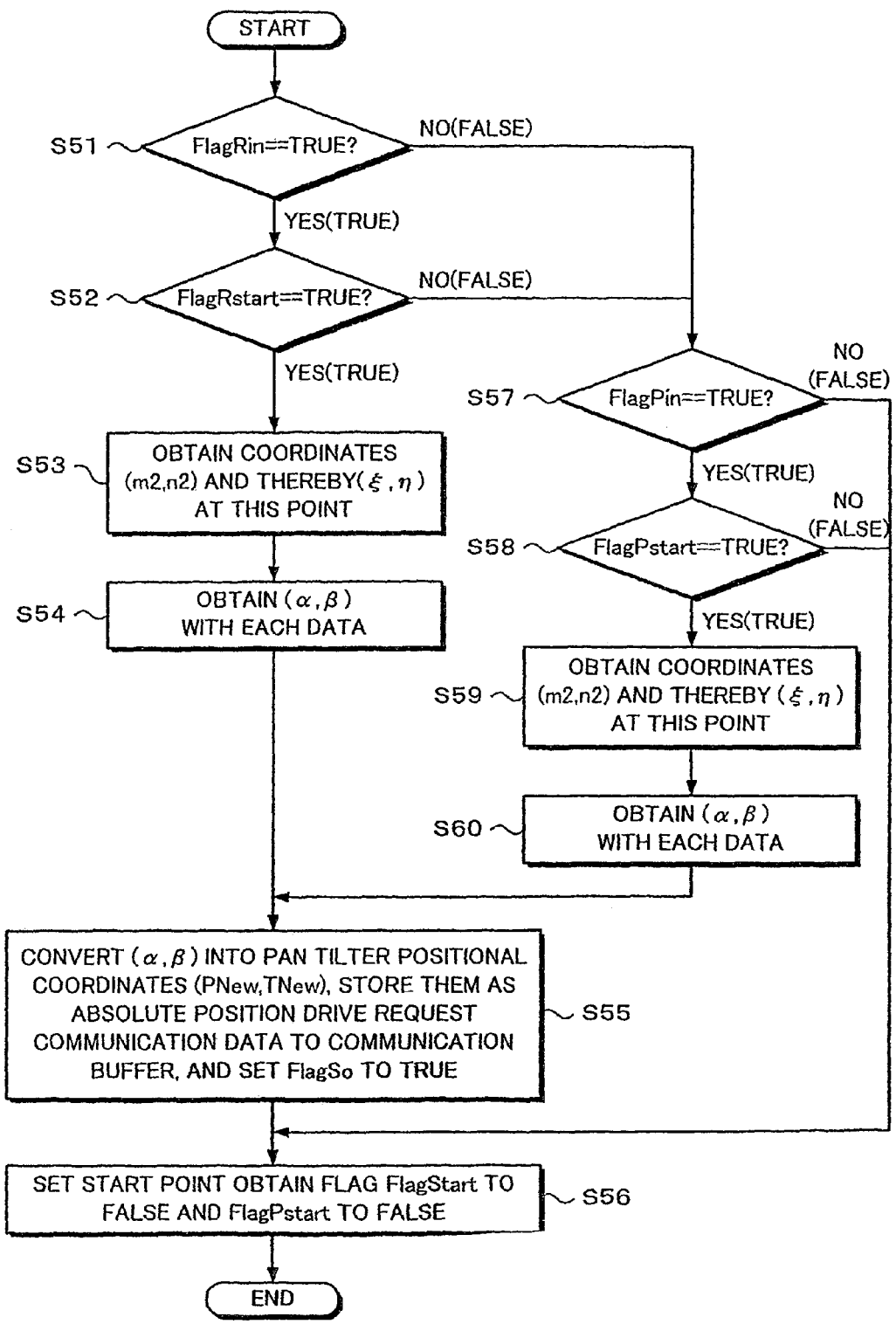
FIG. 20 is a flow chart showing an example of the process of a mouse up/down event according to the embodiment of the present invention.

Next, the mouse button down event and the button up event will be described. In the method for directly designating a desired point of the operation area 6A or the panorama operation area 6B, only the algorithm of a mouse button down event shown in FIG. 18 is used. In the method for designating a desired point generated with a desired area, both the algorithm of a mouse button down event shown in FIG. 19 and the algorithm of a mouse button up event shown in FIG. 20 are used.

With reference to a flow chart shown in FIG. 18, the algorithm of the button down event for the method for directly designating a desired point of the operation area will be described. This event is an event that occurs when the left button of the mouse 8 is pressed. In the present invention, this event is used as trigger information for driving the pan tilter 28. When this event occurs, the flow advances to step S31. At step S31, the system determines whether or not the mouse pointer 8 is present in the operation area 6A corresponding to the operation area flag. When the operation area flag has been set (FlagRin==True) (namely, the determined result at step S31 is Yes), since the mouse pointer of the mouse 8 is present in the operation area 6A, the flow advances to step S32. When the operation area flag has been cleared (FlagRin==False) (namely, the determined result at step S31 is No), since the mouse pointer of the mouse 8 is not present in the operation area 6A, the flow advances to step S34.

When the mouse pointer of the mouse 8 is present in the operation area 6A (namely, the determined result at step S31 is Yes), the flow advances to step S32. At step S32, the system calculates angular information ($\alpha$, $\beta$) of the pan tilter 28 with the angular information ($\theta$, $\phi$) of the current pan tilter 28 obtained from the received data, the magnification information ($\gamma$) of the zoom lens 16, and the positional coordinate ($\theta$, $\eta$) of the mouse pointer of the mouse 8 in the operation area 6A corresponding to Eq. (4) or Eq. (5) so that the designated object in the operation area is placed at the center of the screen.

At step S33, the system converts the angular information ($\alpha$, $\beta$) of the pan tilter 28 into the internal positional information (PNew, TNew) corresponding to the method shown in FIG. 11. The system stores the converted positional information (PNew, TNew) in the send buffer along with the absolute position drive command of the pan tilter 28. In addition, the system sets the data send request flag (FlagSo==True) and sends the data with the process of the timer event.

After the system has determined that the mouse pointer of the mouse 8 is not present in the operation area 6A (namely, the determined result at step S31 is No), the flow advances to step S34. At step S34, the system determines whether or not the mouse pointer of the mouse 8 is present in the panorama operation area 6B corresponding to the panorama operation area flag. When the panorama operation flag has been set (FlagPin==True) (namely, the determined result at step S34 is Yes), since the mouse pointer of the mouse 8 of the panorama operation area 6B is present in the panorama operation area 6B, the flow advances to step S35. When the panorama operation flag has been cleared (FlagPin==False) (namely, the determined result at step S34 is No), this event is completed.

In this flow chart, the system determines whether or not the mouse pointer of the mouse 8 is present in the operation area 6A or the panorama operation area 6B corresponding to the operation area flag (FlagRin) and the panorama operation area flag (FlagPin). When the mouse pointer of the mouse 8 is not present in the operation area 6A and the panorama operation area 6B, this event becomes invalid.

When the mouse pointer of the mouse 8 is present in the panorama operation area 6B (namely, the determined result at step S34 is Yes), the flow advances to step S35. At step S35, the system calculates angular information ($\alpha$, $\beta$) of the pan tilter 28 with the positional information ($\xi$, $\eta$) at the mouse pointer of the mouse 8 in the panorama operation area 6B corresponding to Eq. (9) so that the designated object in the operation area is placed at the center of the screen. Thereafter, the flow advances to step S33.

Next, with reference to FIGS. 19 and 20, the algorithms of the button down event and the button up event for the method for designating a desired point generated with a desired area in the panorama operation area 6B will be described, respectively.

With reference to the flow chart shown in FIG. 19, the algorithm of the button down event will be described. This event is an event that occurs when the left button of the mouse 8 is pressed. In this embodiment, this event is used as an event for determining the start point of a desired area. When this event occurs, the flow advances to step S41. At step S41, the system determines whether or not the mouse pointer of the mouse 8 is present in the operation area 6A corresponding to the operation area flag (FlagRin). When the operation area flag has been set (FlagRin==True) (namely, the determined result at step S41 is Yes), since the mouse pointer of the mouse 8 is present in the operation area 6A, the flow advances to step S42. When the operation area flag has been cleared (FlagRin==False) (namely, the determined result at step S41 is No), since the mouse pointer of the mouse 8 is not present in the operation area 6A, the flow advances to step S44.

When the mouse pointer of the mouse 8 is present in the operation area 6A (namely, the determined result at step S41 is Yes), at step S42, the system sets an operation area start point obtain flag (FlagRstart=True). Thereafter, the flow advances to step S43. At step S43, the system stores positional coordinates (m1, n1) at which the left button of the mouse 8 is pressed as the start point of the desired area.

After the system has determined that the mouse pointer of the mouse 8 is not present in the operation area 6A, at step S44, the system determines whether or not the mouse pointer of the mouse 8 is present in the panorama operation area 6B corresponding to the panorama operation area flag (FlagPin). When the panorama operation area flag has been set (FlagPin==True) (namely, the determined result at step S44 is Yes), since the mouse pointer of the mouse 8 is present in the panorama operation area 6B, the flow advances to step S45. When the panorama operation area flag has been cleared (FlagPin==False) (namely, the determined result at step S44 is No), this event is completed.

In this flow chart, the system determines whether or not the mouse pointer of the mouse 8 is present in the operation area 6A or the panorama operation area 6B corresponding to the operation area flag (FlagRin) and the panorama operation area flag (FlagPin). When the mouse pointer of the mouse 8 is not in the operation area 6A and the panorama operation area 6B, this event becomes invalid.

When the mouse pointer of the mouse 8 is present in the panorama operation area 6B (namely, the determined result at step 44 is Yes), the flow advances to step S45. At step S45, the system sets a panorama operation area start point obtain flag (FlagPstart). Thereafter, the flow advances to step S43.

Next, with reference to a flow chart shown in FIG. 20, the algorithm of the button up event will be described. This event is an event that occurs when the left button of the mouse 8 is released. In the present invention, the button up event is used as an event for determining the end point of a desired area.

When this event occurs, the flow advances to step S51. At step S51, the system determines whether or not the operation area flag has been set (FlagRin==True) (namely, the mouse pointer of the mouse 8 is present in the operation area 6A). When the operation area flag has been set (FlagRin=True) (namely, the determined result at step S51 is Yes), since the mouse pointer of the mouse 8 is present in the operation area 6A, the flow advances to step S52. When the operation area flag has been cleared (FlagRin==False) (namely, the determined result at step S51 is No), since the mouse pointer of the mouse 8 is not present in the operation area 6A, the flow advances to step S57. At step S52, the system determines whether or not the left button of the mouse 8 has been pressed in the operation area 6A corresponding to an operation area start point obtain flag (FlagRstart). When the start point obtain flag has been set (FlagRstart==True) (namely, the determined result at step S52 is Yes), since the left button of the mouse 8 has been pressed in the operation area 6A, the flow advances to step S53. When the start point obtain flag has been cleared (FlagRstart==False) (namely, the determined result at step S52 is No), since the left button of the mouse 8 has not been pressed in the operation area 6A, the flow advances to step S57.

In other words, at steps S51 and S52, the system determines whether or not the operation area flag and the operation area start point obtain flag have been set or cleared. When the operation area flag and the start point obtain flag have been set (FlagRin==True and FlagRstart==True), the system determines that the drive command has taken place in the operation area 6A. Otherwise, at steps S57 and S58, the system determines whether or not the panorama operation area flag (FlagPin) and the panorama operation area start point obtain flag (FlagPstart) have been set or cleared.

When the drive command has taken place in the operation area (namely, the operation area flag and the start point obtain flag have been set (FlagRin==True and FlagRstart==True), at step S53, the system stores the positional coordinates (m2, n2) at which the left button of the mouse 8 has been released in the operation area 6A as the end point of the desired area. Thereafter, the system calculates positional information ($\xi$, $\eta$) as the coordinates of the center of the rectangle area generated with the positional coordinates (m1, n1) of the start point of the desired area and the positional coordinates (m2, n2) of the end point thereof.

At step S54, the system calculates angular information ($\alpha$, $\beta$) of the pan tilter 28 with the angular information ($\theta$, $\phi$) of the pan tilter obtained from the received data, the magnification information ($\gamma$) of the zoom lens 16, and the positional information ($\xi$, $\eta$) at the mouse pointer of the mouse 8 corresponding to Eq. (4) or Eq. (5).

At step S55, the system converts the angular information ($\alpha$, $\beta$) of the pan tilter 28 into the internal positional information (PNew, TNew) of the pan tiler 28 corresponding to the method shown in FIG. 11 and stores the positional information (PNew, TNew) to the send buffer along with the absolute position drive command. In addition, the system sets the data send request flag (FlagSo==True) and sends data with the process of the timer event.

At step S56, after the system has checked the mouse button up event in each operation area, the system clears the operation area start point obtain flag and the panorama operation area start point obtain flag (FlagRstart==False and FlagPstart==False). Thereafter, this event is completed.

At step S57, the system determines whether or not the mouse pointer of the mouse 8 is present in the panorama operation area 6B corresponding to the panorama operation area flag (FlagPin). When the panorama operation area flag has been set (FlagPin==True) (namely, the determined result at step S57 is Yes), since the mouse pointer of the mouse 8 is present in the panorama operation area 6B, the flow advances to step S58. When the panorama operation area flag has not been set (FlagPin==False), since the mouse pointer of the mouse 8 is not present in the panorama operation area 6B, the flow advances to step S56. At step S58, the system determines whether or not the left button of the mouse 8 has been pressed in the panorama operation area 6B corresponding to the panorama operation area start point obtain flag (FlagPstart). When the start point obtain flag has been set (FlagPstart==True) (namely, the determined result at step S58 is Yes), since the left button of the mouse 8 has been pressed in the panorama operation area 6B, the flow advances to step S59. When the start point obtain flag has not been set (FlagPstart==False) (namely, the determined result at step S58 is No), since the left button of the mouse 8 has not been pressed in the panorama operation area 6B, the flow advances to step S56.

When the panorama operation area flag and the panorama operation start point obtain flag have been set (FlagPin==True and FlagPstart==True) at steps S57 and S58, the system determines that a drive command has issued in the panorama operation area 6B. When the conditions at steps S51, S52, and S58 are not satisfied, this event becomes invalid.

When the drive command has been issued in the panorama operation area 6B (namely, the panorama operation area flag and the start obtain flag have been set (FlagPin==True and Flag-pstart==True), the flow advances to step S59. At step S59, the system stores the positional coordinates (m2, n2) at which the left button of the mouse 8 has been released in the panorama operation area 6B as the end point of the desired area. The system calculates the positional information (ξ, η) of the mouse pointer of the mouse 8 as the coordinates of the center of the rectangle area with the positional coordinates (m1, n1) of the start point of the desired area that has been stored and the positional coordinates (m2, n2) of the end point of the desired area corresponding to Eq. (6).

At step S60, the system calculates angular information (α, β) of the pan tilter 28 with the positional information (ξ, η) at the mouse pointer of the mouse 8 in the panorama operation area 6B corresponding to Eq. (9) so that the designated object in the panorama operation area is placed at the center of the screen. Thereafter, the flow advances to step S55.

Figure 21:
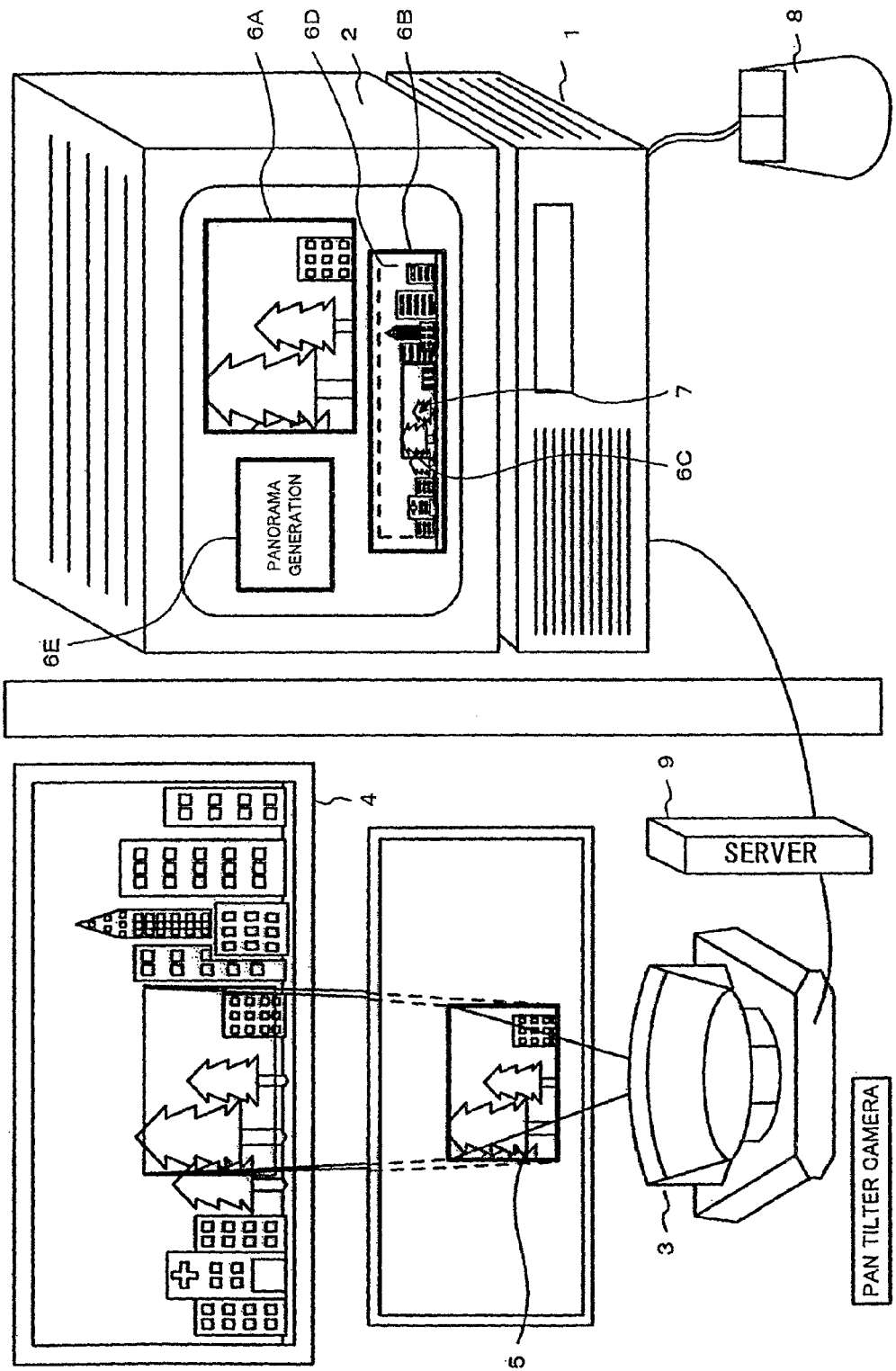
FIG. 21 is a schematic diagram showing the structure of a system according to a second embodiment of the present invention.

In the above-described embodiment, one computer performs all processes of the system. On the other hand, according to a second embodiment of the present invention, as shown in FIG. 21, processes are shared by a server computer and a client computer so as to control a pan tiler camera through a network that has a restriction of a communication capacity. In FIG. 21, a computer 1 is connected to a monitor 2 and a mouse 8. The computer 1 controls the operation of a pan tilter camera 3 disposed at a remote place through a transmission line and a server 9. In other words, the computer 1 composes a controller for a photographing apparatus. The transmission line may be a communication line (radio communication line or a cable communication line), a network, or the like. The computer 1 has a relation of a client to the server 9. A plurality of computers 1 can be connected to the server 9.

The pan tilter camera 3 and the server 9 are disposed on a real scene in an environment denoted by reference numeral 4. A screen photographed by the pan tilter camera 3 disposed on the real scene 4 is denoted by reference numeral 5. Hereinafter, the screen 5 is referred to as photographed screen. The photographed screen 5 is an actually photographed screen. When the zoom lens is placed on the telephotograph side, the angle of view decreases. In contrast, when the zoom lens is placed on the wide-angle side, the angle of view increases.

A picture photographed by the pan tilter camera 5 is sent to a server 9. The server 9 converts the photographed picture into video data. The video data is sent to the computer 1 through a transmission line. The video data sent to the computer 1 is decoded and displayed on the monitor 2. The monitor 2 displays the photographed screen 5 in the operation area 6A thereof. A panorama picture with which a picture photographed by the pan tilter camera 3 is superimposed is displayed in the panorama operation area 6B. As with the above-described embodiment, a desired point of the panorama operation area 6B (or the operation area 6A) or a desired point generated with a desired point is designated with the mouse 8 (cursor 7). The pan tilter camera 3 is driven through the server 9 and the transmission line and thereby the photographed screen is moved. In other words, the pan tilter camera 3 is controlled through the server 9 so that the selected object is placed at the center of the operation area 6A.

Figure 22:
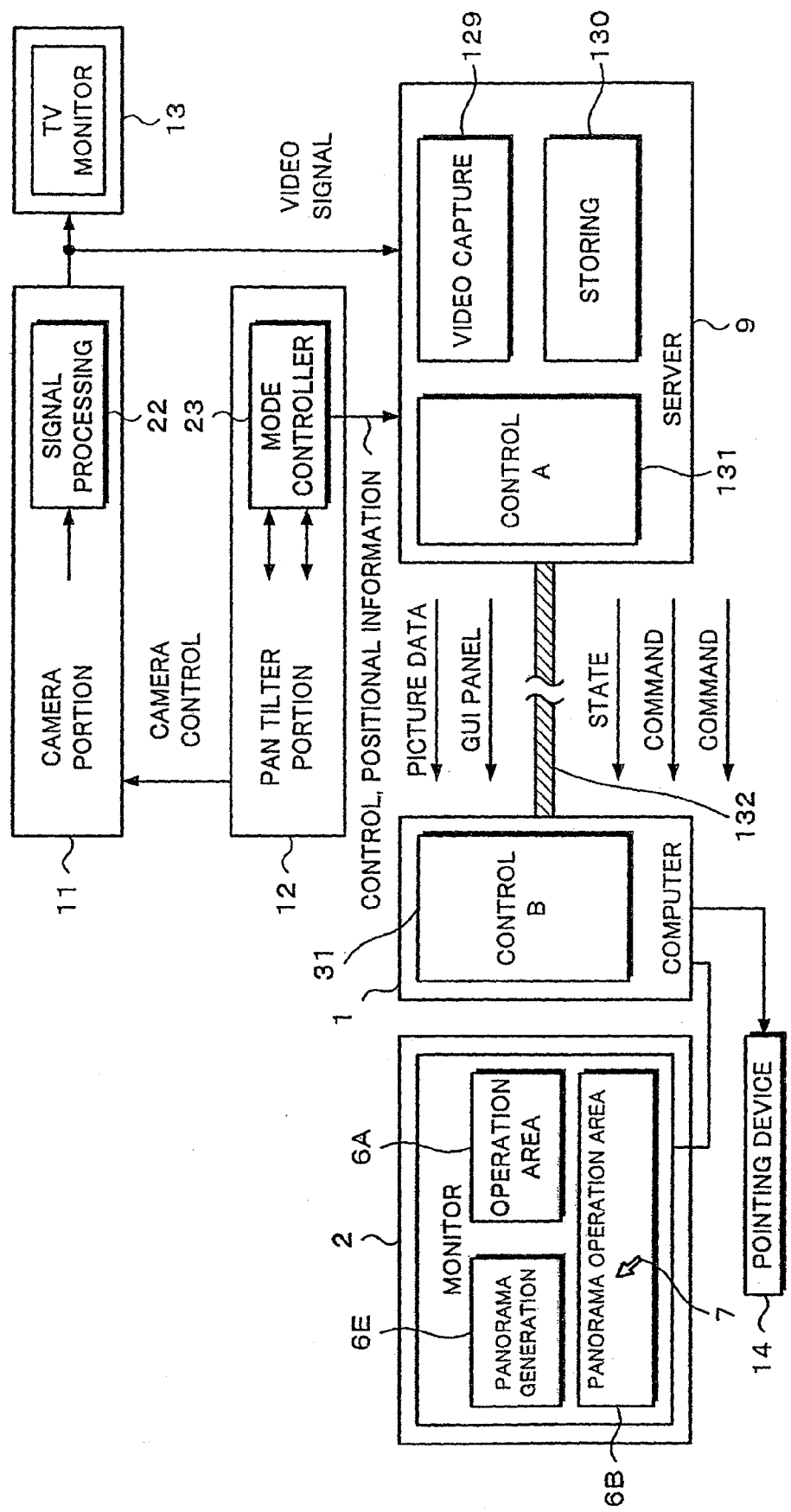
FIG. 22 is a block diagram showing the structure of the system according to the second embodiment of the present invention.
Figure 23:
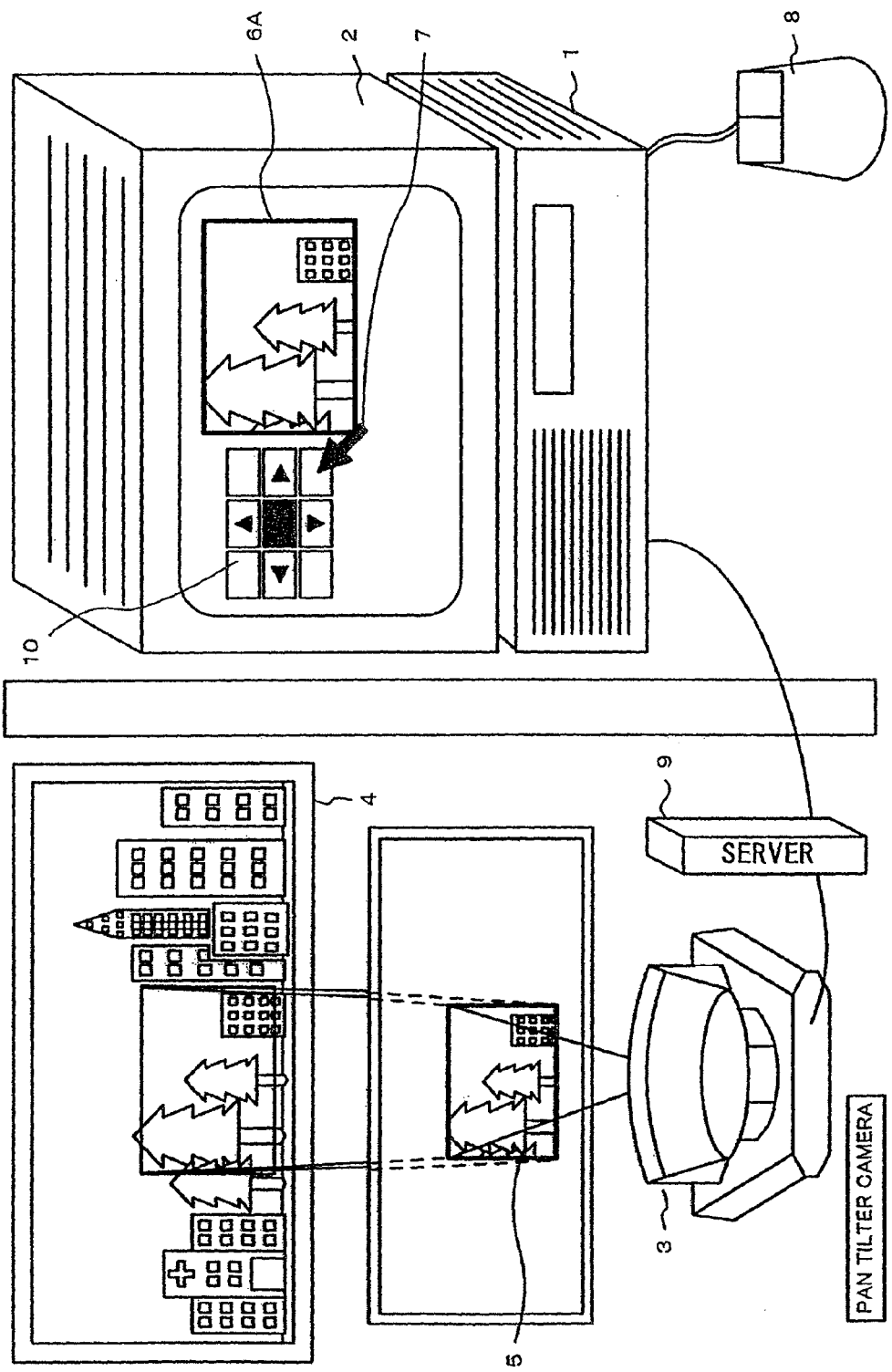
FIG. 23 is a schematic diagram for explaining a controller for a photographing apparatus.

FIG. 22 is a block diagram showing the overall system of the second embodiment of the present invention. Since the structures and functions of the camera portion 11 and the pan tilter portion 12 are the same as those of the first embodiment, the structures thereof are omitted in FIG. 22. The server 9 comprises a controlling portion 131, a video capture portion 129, and a storing portion 130. The video capture portion 129 is composed of a video capture board. The computer 1 is connected to a transmission path 132 through a network. The computer 1 is composed of a controlling portion 31 and so forth as with the first embodiment. Since the algorithms used in the computer 1 are the same as those of the first embodiment, for simplicity, their description is omitted.

Rays emitted from an object are sent to the camera portion 11 as with the first embodiment. The camera portion 11 converts the rays into various signals such as a brightness signal (Y), a color signal (C), and a video signal and supplies the resultant signals as picture signals to a TV monitor 13 and the video capture portion 129 of the server 9. As with the first embodiment, the pan tilter portion 12 has a mode controller, a camera controller, and a pan tilter controller. These controllers control the camera portion 11 and the pan tilter 28. The mode controller 23 controls the overall system corresponding to the internal states of the camera portion 11 and the pan tilter portion 12 and an external command as with the first embodiment.

The mode controller 23 is connected to the server 9 through a communication path (in reality, RS232C interface). The mode controller 23 sends commands received from the server 9 and commands received from the computer 1 through the server 9 to the pan tilter controller and the camera controller so as to drive the pan tilter and the zoom lens of the lens block portion. The mode controller 23 always receives information from the pan tilter controller and the camera controller so as to send the inner state of the pan tilter camera to the outside through the server 9.

The server 9 obtains the inner state of the pan tilter camera (for example, the current positional information of the pan tilter and the zoom lens, and so forth) from the mode controller 23 of the pan tilter portion 12 at predetermined intervals. To send a picture photographed by the camera portion 11 to the transmission path 132, the video capture portion 129 is used. The video capture portion 129 converts a picture signal received from the camera portion 11 to digital picture data that is sent to the transmission path 132 in any quality (in the present embodiment, still picture JPEG format or still picture bit map format). The resultant digital picture is stored in a storing portion 130 (for example, a hard disk).

When the computer 1 issues a connection request to the server 9, the server 9 sends a GUI (Graphical User Interface) panel information to the computer 1 so as to display a picture on the monitor 2. The panel information is an arrangement of a panel and a program that runs on the computer 1 when the mouse is operated on the panel. Examples of the panel information are programs written in HTML, JAVA, and so forth. Picture data photographed by the pan tilter camera and the state thereof are sent to the computer 1 through the transmission path 132 at predetermined intervals.

In another embodiment, Internet is used as the transmission path 132. Data is exchanged on the transmission path 132 using the HTTP protocol. The computer 1 causes the monitor 2 to display GUI panel information, picture information, the state of the pan information, picture information, the state of the pan tilter camera, and so forth received from the server 9 with an Internet browser. An operation area 6A, a panorama operation area 6B, a panorama picture generation button 6E, zoom operation buttons, a cursor 7 of a pointing device 14 (mouse 8), and so forth displayed on the GUI panel of the monitor 2. Picture data received from the server is decoded and displayed in the operation area 6A. When the picture data is updated, the picture is also rewritten in the operation area 6A. The moving range of the pan tilter camera, the position of the pan tilter, angle-of-view of the zoom, and so forth are displayed on the panorama operation area 6B, with the same method as the first embodiment. The computer 1 executes the operation program for the GUI panel received from the server 9.

In the second embodiment of the present invention, a drive command of the pan tilter camera 3 and an operation command of the server 9 are generated with a clicking operation of the mouse 8. When the mouse 8 is clicked on the panorama generation button 6E, the computer 1 causes the server 9 to generate a panorama screen. When the server 1 receives this command, as with the first embodiment, the server 9 moves the pan tilter and the zoom lens to relevant positions, photographs ten pictures at these positions, maps them to the virtual spherical surface, normalizes them with latitude and longitude, and combines them. After the server 9 has combined these pictures as a panorama picture, it converts the panorama picture into a JPEG format picture. The servers 9 sends the resultant picture to the computer 1 through the transmission line 132.

The computer 1 displays the received panorama picture in the panorama operation area 6B of the monitor 2. Thus, the user can see the environment at the position of the pan tiler camera 3 at a glance. When the mouse 8 is clicked in the panorama operation area 6B, the computer 1 sends to the server 9 a command (absolute position drive command) that causes the position at which the mouse is clicked on the panorama picture to be placed at the center of the operation area 6A (picture). The server 9 sends this command to the pan tilter camera 3. Thus, the pan tilter is driven to a relevant position. In such a manner, the drive target of the pan tilter is designated on the panorama screen. Consequently, the user can easily operate the pan tilter without need to consider a drive command on the network, a delay of a video signal, and so forth.

In the first embodiment, whenever the pan tilter camera 3 sends a picture to the computer 1, the computer 1 combines it and displays the combined picture in the panorama operation area 6B. Alternatively, after the computer has combined all pictures, it may display the resultant picture in the panorama operation area 6B.

According to the first embodiment, the operation area 6A and the panorama operation area 6B are displayed on the monitor 2 connected to the computer 1. Alternatively, the operation area 6A and/or the panorama operation area 6B may be displayed on another display unit other than the monitor 2.

According to the first embodiment, the pan tilter camera 3 is driven by operating the operation area 6A and the panorama operation area 6B with the mouse 8. Alternatively, one of the operation area 6A and the panorama operation area 6B may be operated with the mouse 8.

According to the first embodiment, the operation area 6A and the panorama operation area 6B are displayed on the monitor 2. Alternatively, only the panorama operation area 6B may be displayed on the monitor 2.

According to the first embodiment, the operation area 6A and the panorama operation area 6B are displayed on the monitor 2. By operating the operation area 6A and the panorama operation area 6B with the mouse 8, the pan tilter camera 3 is freely driven. Alternatively, a panorama picture may be displayed on the monitor 2. In this case, the pan tilter camera 3 may be driven with an operation portion such as eight-direction keys.

According to the above-described embodiments, the photographing range of the pan tilter camera 3 may be the maximum moving range of the pan tilter camera 3 or limited with a limiter. The function for limited the photographing range with the limiter may be provided by the pan tilter camera 3 or the computer 1.

In the first embodiments, a desired point generated with a desired area is placed at the center of thereof. Alternatively, a desired point may be placed at for example the center of gravity, the incenter, the circumcenter, or the orthocenter of the area.

According to the first embodiment, a panorama picture displayed in the panorama operation area 6B is not limited as long as it represents the environment in which the pan tilter camera 3 is disposed. For example, the panorama picture may be a moving picture, an intermittent still picture, or a still picture.

According to the second embodiment, for simplicity, one computer 1 is connected to the remote server 9 and the pan tilter camera 3 that are disposed at a remote place. Alternatively, a plurality of servers 9 and a plurality of pan tilter cameras 3 may be disposed worldwide. For example, one pan tilter camera 3 may be controlled by a plurality of computers through for example Internet.

According to the present invention, with a panorama picture, the user can see the environment in which the photographing apparatus is disposed at a glance. Since the positional information of the pan tilter, the angle of view of the zoom lens, and the moving range of the pan tilter are added as information to the picture, the user can easily know the state of the photographing apparatus.

In addition, when the user designates a desired object in the panorama operation area, he or she can easily capture it in the field of view of the picture to be photographed. Moreover, by designating an object in the operation area, the user can precisely adjust the position that cannot be designated in the panorama operation area. In comparison with the conventional method of which the user operates direction keys while observing a monitored picture (namely, a picture is photographed through a feed-back operation and an experience), according to the present invention, a desired object can be displayed at the center of the operation area with the clicking operation of the mouse.

In addition, according to the present invention, since the position to which the pan tilter moves can be predicted beforehand, on a communication line that causes picture and information data to be delayed and/or lost (such as Internet), the user can seamlessly operate the pan tilter camera. Thus, according to the present invention, the pan tilter camera can be easily operated with high visibility.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A controller for controlling an imaging device, comprising:
    a display unit having a panorama display area and an image display area, the panorama display area displaying a panorama picture generated from images taken by the imaging device and the image display area displaying an image picture taken by the imaging device, the image picture being more enlarged than a corresponding image in the panorama picture; and
    a control unit controlling the imaging device to change an imaging direction of the imaging device in response to an operation on at least one of the panorama picture and the image picture.

2. The controller according to claim 1, wherein:
    if a user designates an object on the image picture, the display unit displays the object corresponding to a designated point at substantively a center of the image display area.

3. The controller according to claim 1, wherein:
the display unit displays the panorama picture and the image picture on one screen.

4. The controller according to claim 1, wherein:
the display unit displays a frame on the panorama picture, the frame representing an angle of view of the image picture.

5. A method for controlling an imaging device, comprising the steps of:
providing a display with a panorama display area and an image display area, the panorama display area displaying a panorama picture generated from images taken by the imaging device and the image display area displaying an image picture taken by the imaging device, wherein the image picture is more enlarged than a corresponding image in the panorama picture; and
controlling the imaging device to change an imaging direction of the imaging device in response to an operation on at least one of the panorama picture and the image picture.

6. The method according to claim 5, further comprising the step of:
if a user designates an object on the image picture, displaying the object corresponding to a designated point at substantively a center of the image display area.

7. The method according to claim 5, further comprising the step of:
displaying the panorama picture and the image picture on one screen.

8. The method according to claim 5, further comprising the step of:
displaying a frame on the panorama picture, the frame representing an angle of view of the image picture.

9. A computer readable medium encoded with a program to be executed by a computer for controlling an imaging device, the program comprising the steps of:
providing a display with a panorama display area and an image display area, the panorama display area displaying a panorama picture generated from images taken by the imaging device and the image display area displaying an image picture taken by the imaging device, wherein the image picture is more enlarged than a corresponding image in the panorama picture; and
controlling the imaging device to change an imaging direction of the imaging device in response to an operation on at least one of the panorama picture and the image picture.

10. The medium according to claim 9, further comprising the step of:
if a user designates an object on the image picture, displaying the object corresponding to a designated point at substantively a center of the image display area.

11. The medium according to claim 9, further comprising the step of:
displaying the panorama picture and the image picture on one screen.

12. The medium according to claim 9, further comprising the step of:
displaying a frame on the panorama picture, the frame representing an angle of view of the image picture.

13. A system for designating a desired position comprising:
an imaging device;
a display unit having a panorama display area and an image display area, the panorama display area displaying a panorama picture generated from images taken by the imaging device and the image display area displaying an image picture taken by the imaging device, the image picture being more enlarged than a corresponding image in the panorama picture; and
a controller controlling the imaging device to change an imaging direction of the imaging device in response to an operation on at least one of the panorama picture and the image picture.

14. The controller according to claim 13, wherein:
if a user designates an object on the image picture, the display unit displays the object corresponding to a designated point at substantively a center of the image display area.

15. The controller according to claim 13, wherein:
the display unit displays the panorama picture and the image picture on one screen.

16. The controller according to claim 13, wherein:
the display unit displays a frame on the panorama picture, the frame representing an angle of view of the image picture.

* * * * *